United States Patent [19]

Vea

[11] Patent Number: 4,908,825
[45] Date of Patent: Mar. 13, 1990

[54] MEMORY ORGANIZATION AND OUTPUT SEQUENCER FOR A SIGNAL PROCESSOR

[75] Inventor: Matthew J. J. Vea, Rowlett, Tex.

[73] Assignee: Northern Telecom Limited, Montreal, Canada

[21] Appl. No.: 179,269

[22] Filed: Apr. 8, 1988

[51] Int. Cl.[4] .............................................. H04J 3/12
[52] U.S. Cl. .................................. 370/110.3; 379/283
[58] Field of Search ....................... 370/110.3; 379/283

[56] References Cited

U.S. PATENT DOCUMENTS

| Re. 29,460 | 10/1977 | Mills | 370/110.3 |
|---|---|---|---|
| 3,516,071 | 6/1970 | Roos | 370/110.3 |
| 3,773,981 | 11/1973 | Stilwell et al. | 370/110.3 |
| 4,153,819 | 3/1979 | Olsen . | |
| 4,277,650 | 1/1981 | Arend et al. . | |
| 4,399,536 | 11/1983 | Metz . | |
| 4,460,806 | 12/1984 | Canniff et al. . | |
| 4,460,808 | 7/1984 | Battista et al. . | |
| 4,502,049 | 3/1985 | Atkinson . | |
| 4,626,628 | 7/1986 | Ramsaran et al. . | |
| 4,626,629 | 8/1986 | Premoli et al. . | |

Primary Examiner—Robert L. Griffin
Assistant Examiner—Wellington Chin
Attorney, Agent, or Firm—Nixon & Vanderhye

[57] ABSTRACT

A specialized tone receiver is capable of detecting tones on many different digital signal channels simultaneously. A single memory is used to buffer incoming digital signals. Independent write and read sequencers write samples into and read samples from the buffer memory, respectively. The write sequencer writes all samples corresponding to a given sample time at essentially the same time, while the read sequencer reads out all of the samples corresponding to a given channel of interest in reverse sequential chronological order (i.e., in the opposite order from the order the samples were written) beginning with the most current sample. A priority structure controls access to the buffer memory, with the read sequencer being granted a higher access priority than the write sequencer. A filtering algorithm symmetrical in time and executed by a digital signal processor controlled by the same microcode sequencer which controls the read sequencer is used to detect specific frequencies present in the read channel samples. A separate, slower processor performs time validation functions on a time scale which is extremely slow compared with the time scale at which frequency validation is performed. The specialized tone receiver is extremely fast, requires only a single, relatively small input buffer memory (e.g., 128K bytes for a 512 channel PCM bus), and is capable of detecting several different specialized signalling tones on all of the channels of a multiport mulitchannel PCM bus in very close to real time.

21 Claims, 10 Drawing Sheets

FIG. 2(A) INPUT BUFFER MEMORY MAP

| Address | Contents |
|---|---|
| 5FFFFF | EMPTY |
| 440000 | |
| 43FFFF | CHANNEL 511 TEST 31 |
| 43FE00 00 | ⋮ |
| 43C5FF | |
| | CHANNEL 482 TEST 02 |
| 43C400 | |
| 43C3FF | |
| | CHANNEL 481 |
| 43C200 00 | ⋮ |
| 4025FF | |
| | CHANNEL 018 |
| 402400 | |
| 4023FF | |
| | CHANNEL 017 TEST 01 |
| 402200 | |
| 4021FF | |
| | CHANNEL 016 TEST 00 |
| 402000 | |
| 401FFF | |
| | CHANNEL 015 |
| 401E00 00 | ⋮ |
| 4007FF | |
| | CHANNEL 003 |
| 400600 | |
| 4005FF | |
| | CHANNEL 002 |
| 400400 | |
| 4003FF | |
| | CHANNEL 001 |
| 400200 | |
| 4001FF | |
| | CHANNEL 000 |
| 400000 | |

| Address | Contents |
|---|---|
| 4001FF | SAMPLE N |
| 4001FE | EMPTY |
| 4001FD | SAMPLE N−1 |
| ⋮ | ⋮ |
| 400003 | SAMPLE N−254 |
| 400002 | EMPTY |
| 400001 | SAMPLE N−255 |
| 400000 | EMPTY |

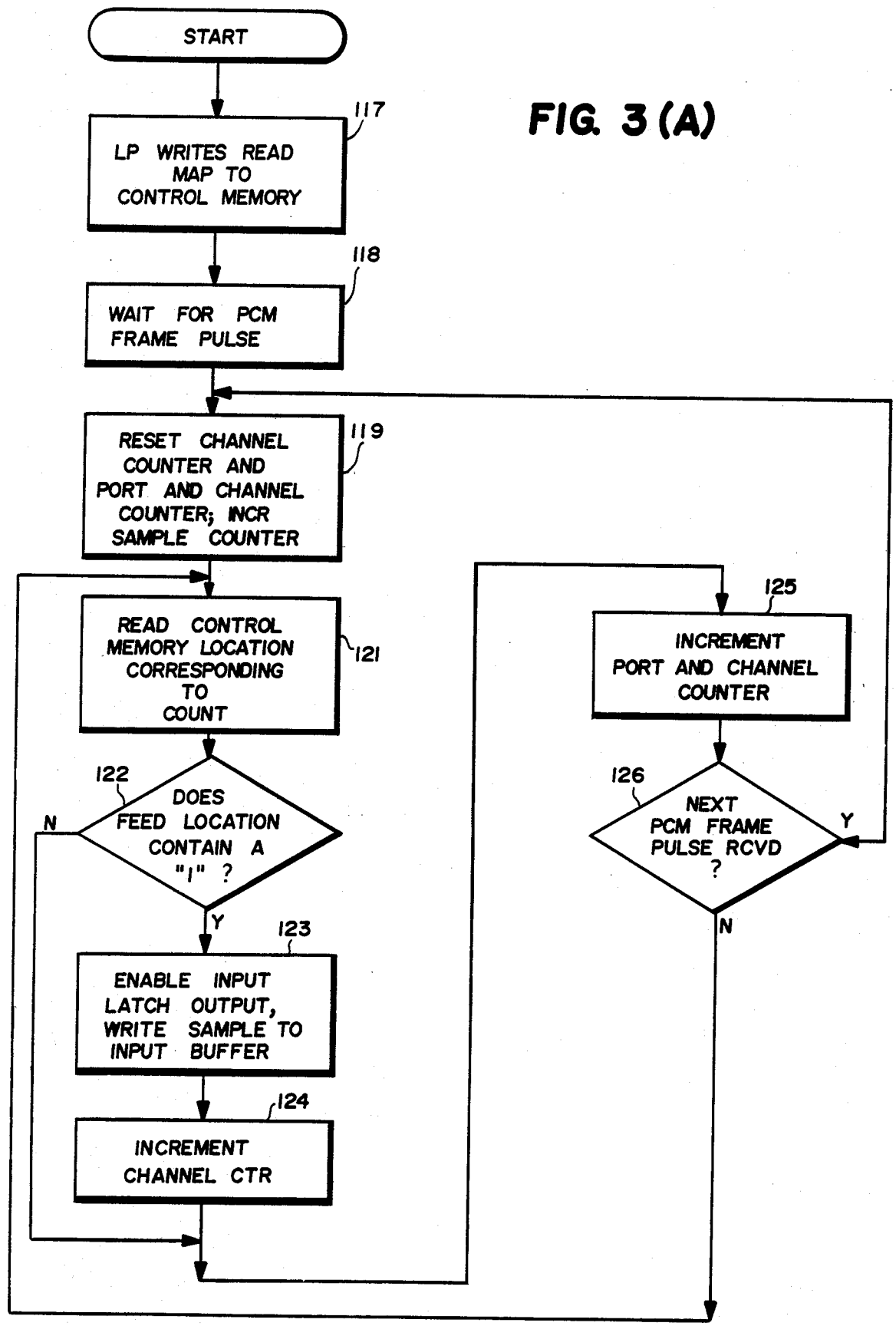

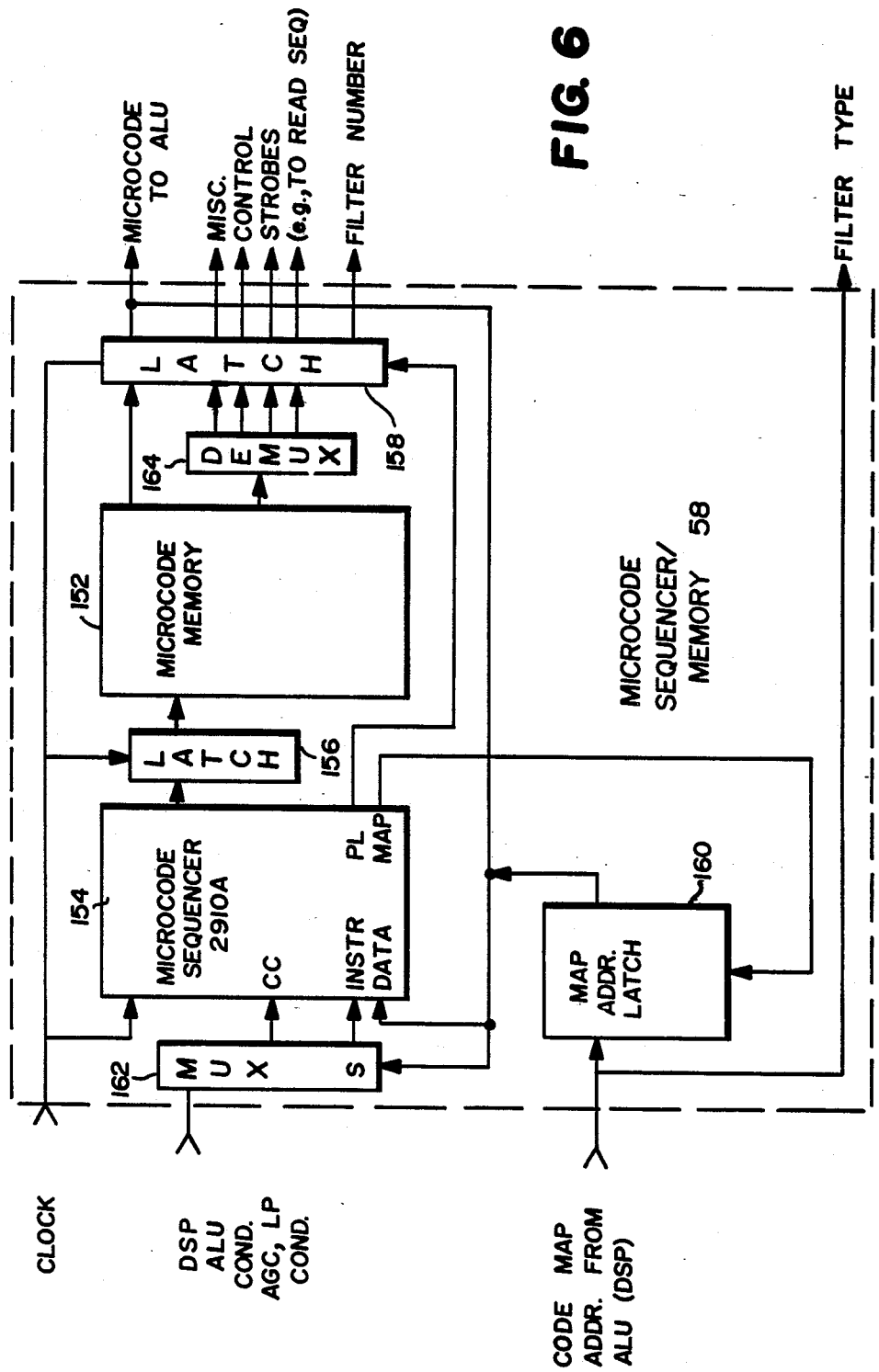

MEMORY ORGANIZATION AND OUTPUT SEQUENCER FOR A SIGNAL PROCESSOR

FIELD OF THE INVENTION

This invention relates to the field of digital electrical signal processing, and more specifically to real time detection of digitized audio signal tones carried on a digital PCM bus.

BACKGROUND AND SUMMARY OF THE INVENTION

In communications systems there is often a need to receive and detect specific audio tones and to take action in response to such tones essentially in real time. Telephone systems carry "specialized" audio tones which have predetermined significances requiring rapid action by a switch or other circuitry. For example, depression of the "*" or "#" key on a standard telephone touch-tone keypad generates a tone that may initiate a corresponding response at the telephone exchange switch (e.g., a call reorigination). Receipt of other tone combinations (e.g., so-called "Special Information Tones"—SITs that precede prerecorded announcements and special signalling tones received from telephone systems abroad) may require other responses by the telephone system. To minimize apparent delay to the caller (and for other reasons as well, including efficient traffic handling), it is important that tone detection and responsive functions are performed in close to real time. Since some types of specialized tones can occur at any time during a telephone call, it is necessary to provide real-time specialized tone detection during the entire call duration.

In the past, specialized analog tone detectors were provided on each telephone channel to detect specialized tones. For example, one or more analog bandpass filter circuit might have been provided to detect and decode the DTMF tone combinations associated with the touch-tone "#" key. Such an analog circuit detected tones in real time and provided acceptable performance. Exemplary analog tone detection arrangements are disclosed in U.S. Pat. No. 4,153,819 to Olsen (May 8, 1979) and U.S. Pat. No. 4,626,628 to Biray et al (Dec. 2, 1986), both commonly owned by Northern Telecom (the assignee of the subject application).

Unfortunately, providing separate signal processing circuitry for the various active telephone channels substantially increases the complexity and cost of the overall telephone system.

Digitization of telephone signals and the use of digital PBX switch arrangements have become commonplace. For example, pulse code modulation (PCM) time division multiplexed (TDM) parallel bus arrangements are now commonly used to carry many hundreds of distinct telephone speech channels for processing by a digital switch. In one exemplary arrangement, 480 digitized speech channels (plus additional signalling channels used to carry control and other signals) are carried on a single PCM bus, with a different discrete time slot in the TDM frame structure being allocated to each different speech channel. This arrangement for handling speech channels has tremendous advantages over past techniques requiring separate analog signal pathways for the different analog channels, as those skilled in the art will readily appreciate.

It is, of course, generally known to perform in the digital domain detection, decoding, filtering and other signal processing functions which in the past have been performed in the analog domain. For example, U.S. Pat. No. 4,277,650 to Arend entitled "Single Frequency Tone Receiver" (July 7, 1981) discloses a digital tone receiver which indicates the presence of a PCM tone signal in a bit stream of PCM signal samples. Efficient detection of tones in real time on the various channels conveyed by a telephone system PCM bus is a significant problem.

One approach used in the past was to provide several redundant digital tone receivers in the system, and then allocate such receivers as needed to monitor specific PCM bus channels during the entire duration of telephone calls carried by the channel. A significant drawback of this approach is that each receiver can only monitor one or a few channels at a time—so that many receivers are required to accommodate heavy system loading. The cost and complexity of such systems was significantly increased as a result.

In an attempt to overcome these problems, the so-called digital "universal tone receiver" was developed. Some such universal tone receivers are capable of monitoring several PCM bus channels simultaneously and detecting and decoding tone(s) selected in accordance with coded program instructions. The following (by no means exhaustive) list of prior issued U.S. patents generally relate to universal digital tone receivers:

U.S. Pat. No. 4,460,806 - Canniff
U.S. Pat. No. 4,399,536 - Metz
U.S. Pat. No. 4,502,049 - Atkinson
U.S. Pat. No. 4,626,629 - Cannalire
U.S. Pat. No. 4,460,808 - Battista An exemplary digital tone receiver which was developed a few years ago by the assignee of the subject application (and designated Universal Tone Receiver) includes a digital signal processor which can monitor several bus channels simultaneously and produce outputs based on detection of predetermined (i.e., preprogrammed) tones on any of up to 32 PCM speech channels simultaneously. This tone receiver includes three memory devices for buffering data received from the bus. The tone receiver processes signals stored in two of the read memories while newly received bus data is stored in another read memory. When the memory storing newly received bus data becomes full, the receiver begins processing signals from that memory and another read memory is used to store incoming bus data.

While this digital tone receiver is highly successful in its own right, further improvements in digital tone receivers are possible. For example, it is desirable to use as little hardware as possible for detecting various different specialized tones appearing on any one(s) of many PCM bus channels (e.g., approximately 500 different channels) substantially in real time so that prompt action can be taken by the switch (or other control system) in response to the appearance of the tones. Tone detection should be both highly reliable and fast (countervailing design objectives) even under heavy PCM bus loading—when most or all bus channels are being used to carry digitized speech signals. In addition, tone detection in real time should not require apparatus which is overly complex and costly or unreliable and prone to breakdown.

The present invention provides a specialized tone receiver which is capable of detecting tones on many different digital signal channels simultaneously. A single memory is used to buffer incoming digital signals. Independent write and read sequencers write samples into and read samples from the buffer memory, respectively. The write sequencer writes all samples corresponding to a given sample time at essentially the same time, while the read sequencer reads out all of the samples corresponding to a given channel of interest in reverse sequential chronological order (i.e., in the opposite order from the order the samples were written) beginning with the most current sample. A priority structure controls access to the buffer memory, with the read sequencer being granted a higher access priority than the write sequencer. A filtering algorithm symmetrical in time is used to detect specific frequencies present in the read channel samples. A separate processor performs time validation functions on a time scale which is extremely slow compared with the time scale at which frequency validation is performed.

The resulting specialized tone receiver is extremely fast, requires only a single, relatively small input buffer memory (e.g., 128 Kbytes for a 512 channel PCM bus), and is capable of detecting several different specialized signalling tones on all of the channels of a multiport multichannel PCM bus in very close to real time.

These and other features and advantages of the present invention may be better and more completely understood by referring to the following detailed description of a presently preferred exemplary embodiment in conjunction with the appended sheets of drawings, of which:

FIGS. 2 and 2(A) are schematic maps of exemplary contents of the input buffer shown in FIG. 1;

FIG. 3(A) is a flow chart of steps preformed by the write sequencer shown in FIG. 1;

FIG. 6 is a schematic block diagram of the microcode sequencer shown in FIG. 1;

Figure 1:
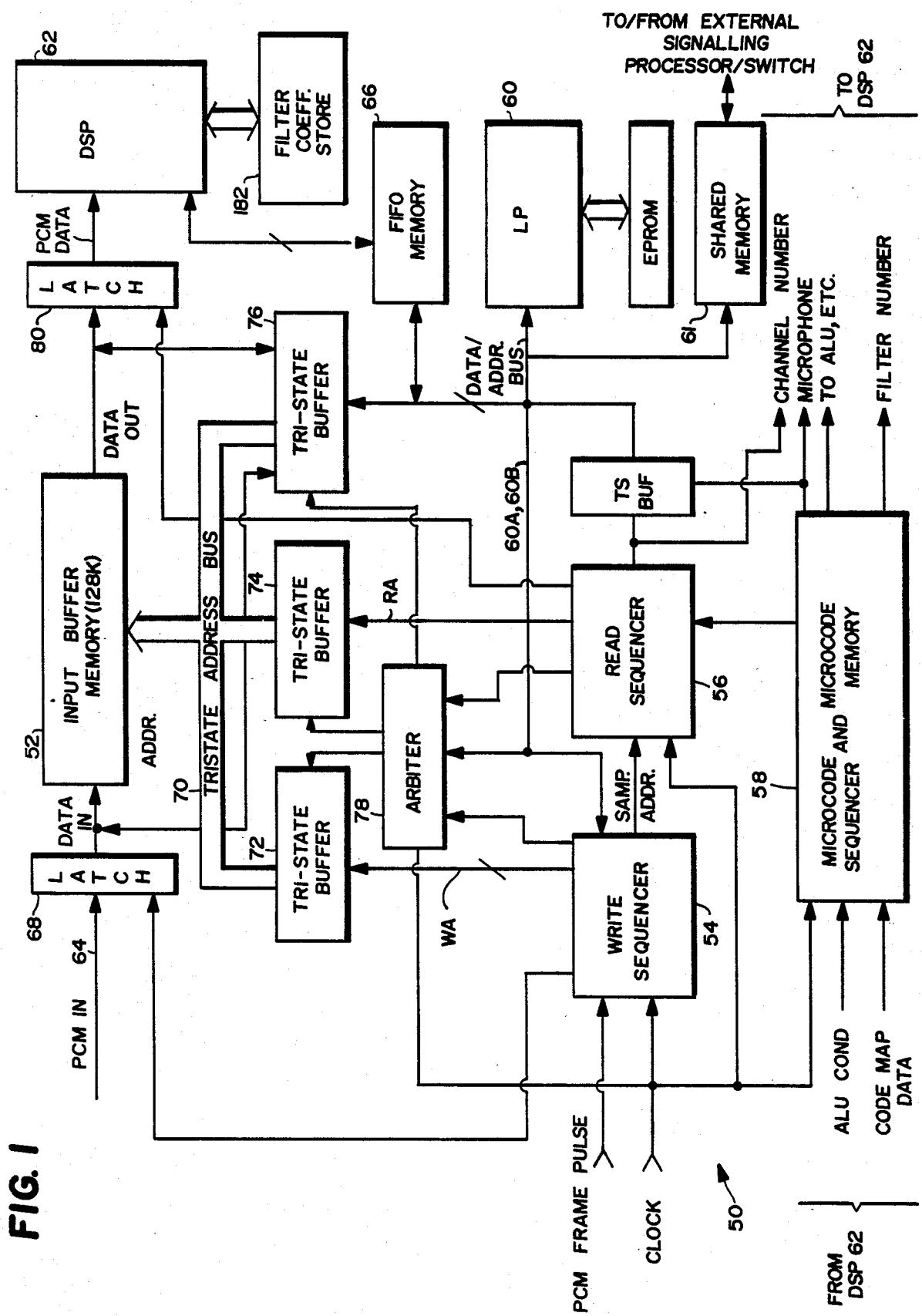
FIG. 1 is a schematic block diagram of a presently preferred exemplary tone detection system in accordance with the present invention.
Figure 7A:
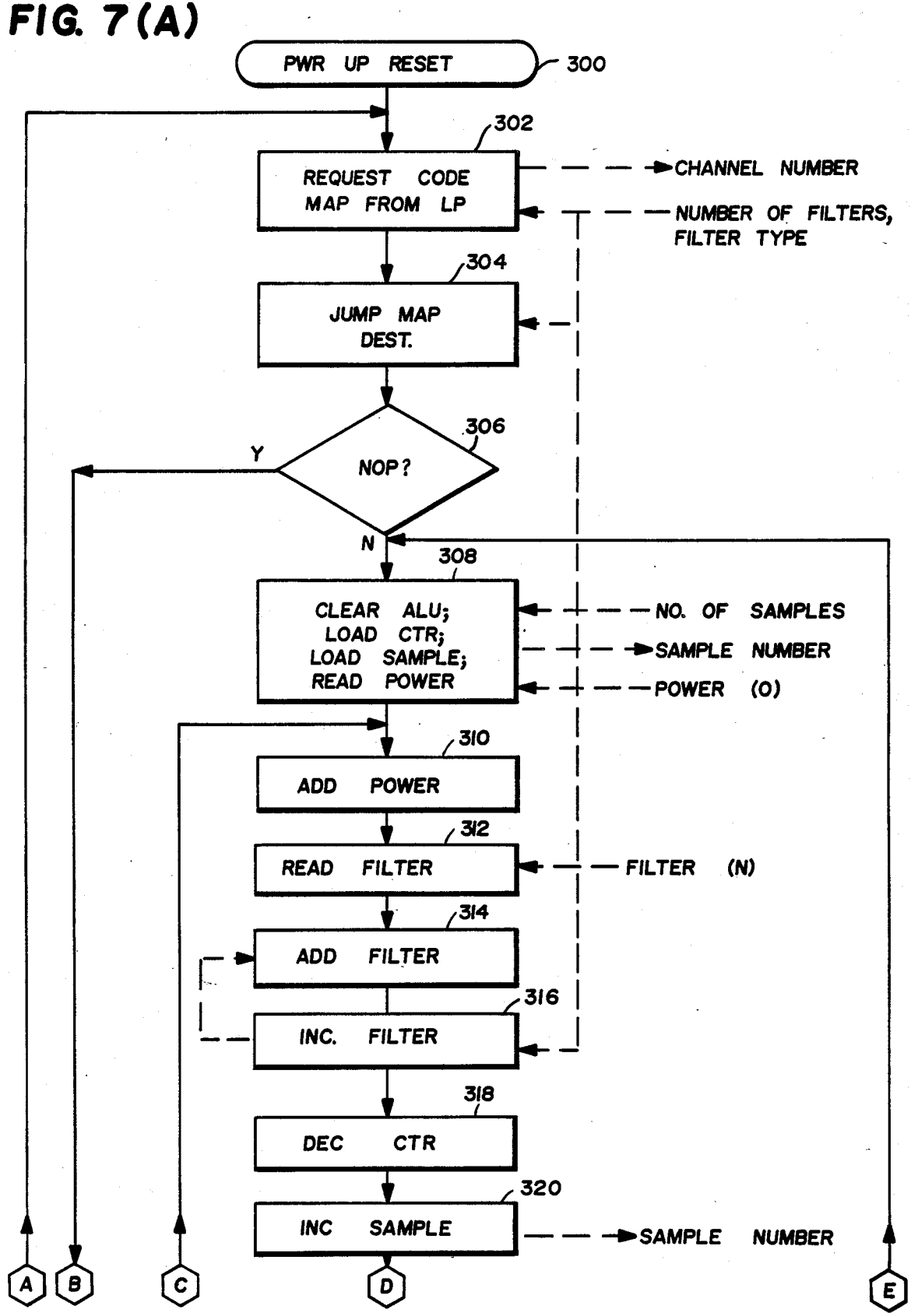
Figure 7B:
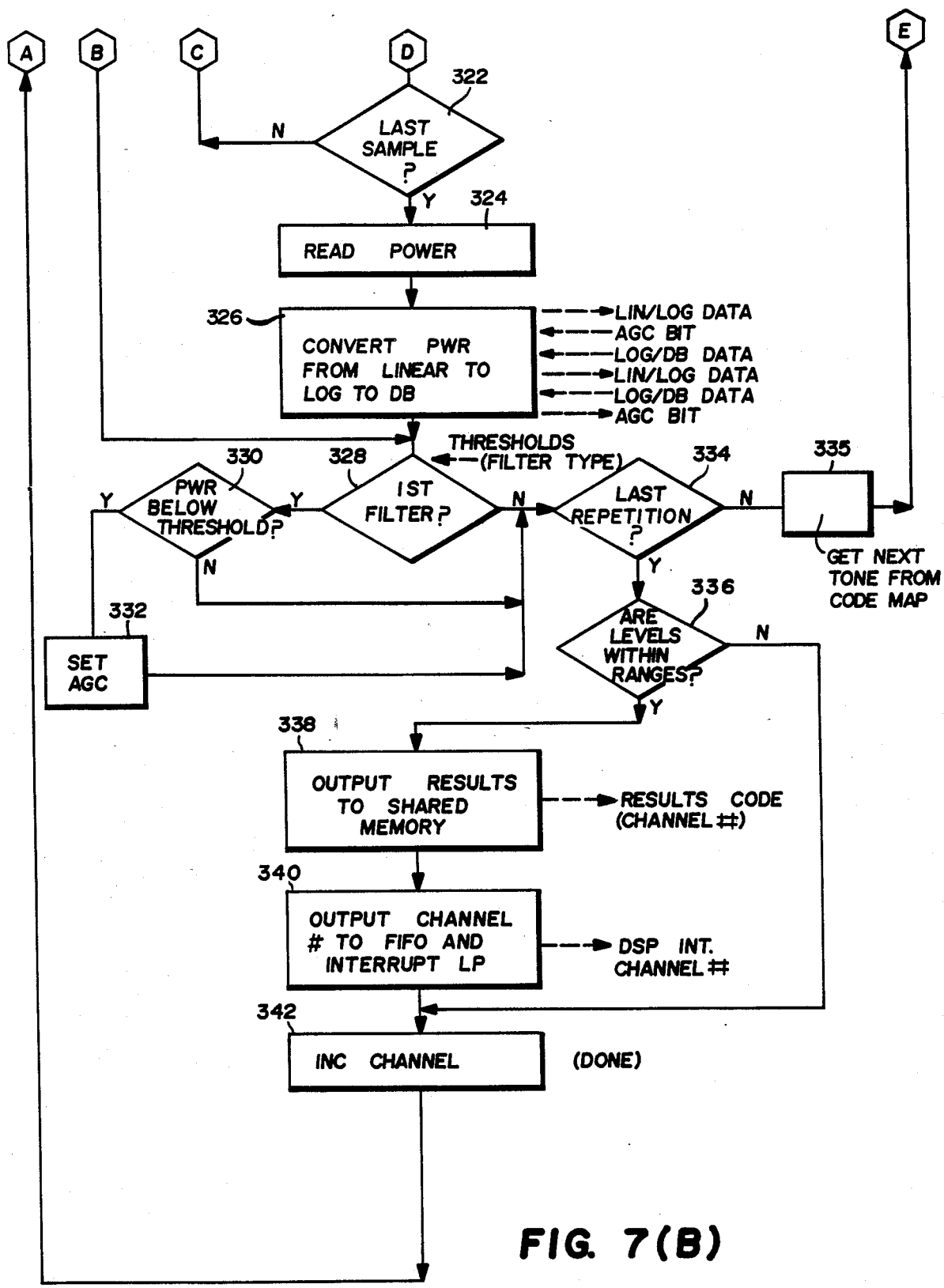

FIGS. 7(A)–7(B) are together a flowchart of the sample read and processing steps performed by the system shown in FIG. 1.

DETAILED DESCRIPTION OF THE DRAWINGS

A functional overview of a presently preferred embodiment of a specialized tone receiver in accordance with the present invention will be presented first, followed by a more detailed description of the overall architecture of that preferred embodiment. Next presented will be the structure and organization of the input buffer memory used to buffer input samples and the manner in which independent read and write sequencers of the preferred embodiment store samples into and read samples from that input buffer memory. Following will be detailed descriptions of the write sequencer, read sequencer, digital signal processor, and microcode sequencer/memory of the preferred embodiment. A description of the algorithm implemented by the read sequencer and the digital signal processor under control of microcode instructions generated by the microcode sequencer/memory will then be presented.

Functional Overview of A Specialized Tone Receiver

A schematic block diagram of a presently preferred exemplary embodiment of a specialized tone receiver system 50 in accordance with the present invention is shown in FIG. 1. System 50 includes an input buffer memory 52, a write sequencer 54, a read sequencer 56, a microcode sequencer/memory 58, a local processor CPU ("LP") 60, and a digital signal processor ("DSP") 62.

Pulse code modulated (PCM) digital signals carried by a PCM bus 64 are applied as an input to system 50. In the preferred embodiment, PCM bus 64 is a conventional parallel multiport time division multiplexed (TDM) speech bus which carries several different digitized audio telephone signals (e.g., speech, signalling tones, and any other signals that can be communicated over telephone lines) essentially simultaneously. In the preferred embodiment, bus 64 carries digital signals corresponding to 640 different telephone channels, and system 50 in the preferred embodiment is capable of buffering and analyzing tone information from 512 channels of 640 (actually 480 of these 512 channels as will be explained) in very close to real time.

Information provided to system 50 from an external signalling processor (not shown) specifies which bus channels the system is to analyze for specialized tones and which specific tones the system is to detect on each channel of interest. System 50 must be capable of detecting tones on all bus channels simultaneously to accomodate heavy loading during peak traffic times.

The data arrival rate over PCM bus 64 is 195 nanoseconds, with 125 microseconds between successive samples for the same channel. Conventional analog-to-digital converters (not shown) responsible for converting analog telephone signals to digital signals for application to the PCM bus 64 sample the incoming analog signal from a particular telephone channel once every 125 microseconds and apply the resulting PCM digital signal "words" to the PCM bus. These PCM "words" are appropriately inserted into a time division multiplexed (TDM) frame structure carried by the PCM bus which recurs once every 125 microseconds (i.e., requiring rapid action by a switch or other upon occurrence of a PCM bus "frame pulse").

Most but not all channels of PCM bus 64 carry digitized telephone signals. Channels 0 and 16 of PCM bus 64 carry control information and are not used for tone reception. Some of the remaining bus channels are typically also not used for tone reception—these channels being reserved for shared resource functions (e.g., tone generation and tone reception performed by tone receivers other than system 50). In the preferred embodiment, system 50 is capable of detecting tones on 512 of 640 PCM bus channels simultaneously—the other 128 channels being used for other functions not requiring specialized tone detection.

Important functions performed by system 50 are to:

(a) collect tone samples from PCM bus channels (in the preferred embodiment, 256 samples—that is, 32 milliseconds worth—are stored for each channel);

(b) read collected tone samples corresponding to PCM bus channels of interest;

(c) analyze the power spectrum of the read tone samples with respect to specific tone frequencies of interest;

(d) if the power spectrum analysis indicates specific tones of interest exist on a specific channel, analyze the data on the channel in the time domain to determine if the tones are present over a minimum required duration; and (e) if both frequency and time domain analyses indicate a particular specialized tone is present, indicate the channel number and identify the tone present to an external control system (e.g., a signalling processor associated with a common carrier switch).

Tone sample collection is performed by input buffer memory 52 and write sequencer 54 in the preferred embodiment. Write sequencer 54 extracts samples from PCM bus 64 at the appropriate time slots. Samples for 512 channels (480 active channels and 32 test channels) are stored into input buffer 52 by write sequencer 54. Read sequencer 56 (which operates independently from write sequencer 54 in the preferred embodiment) extracts samples corresponding to channels of interest and presents those samples to digital signal processor ("DSP") 62 for frequency domain analysis. DSP 62 analyzes the samples presented to it (in reverse chronological order in the preferred embodiment, as will be explained) to determine whether specific tones are present, and deposits the result of the tests it performs into a shared memory (part of LP 60) used to communicate control signals between the DSP and local processor ("LP") 60. LP 60 performs time domain analysis on the results it obtains from DSP 62—and if it determines specific tones have existed for more than a minimum preset time duration, LP 60 deposits control signals indicating the results of the test it has performed into a shared main memory 61 for communication to a conventional external signalling processor or other control system for appropriate action.

In the preferred embodiment, input buffer memory 52 contains the last 256 "samples" (i.e., digital signals present on PCM bus 64 corresponding to a particular channel) for each of the PCM bus channels of interest (this is typically fewer than all 512 bus channels. Read sequencer 56 reads samples stored in input buffer memory 52 corresponding to selected channels continuously (one sample every 195 nanoseconds) and presents those read samples to DSP 62. DSP 62 performs the filtering and signal level threshold comparisons needed to detect DTMF tone pairs. This detection process may be performed on all 480 active channels of PCM bus 64 in sequence in the preferred embodiment.

In somewhat more detail, DSP 62 rapidly analyzes the samples presented to it to determine the amount of power the samples contain of signals of specific frequencies (using modified Hilbert Transforms) and converts the resulting levels to dB measurements (the overall process performed by DSP 62, which may be called "filtering" but actually encompasses more, effectively combines frequency conversion from audio to just above DC and low pass filtering with bandpass filtering and filtered level comparisons, as will be explained). The resulting dB measurements are then compared with preprogrammed levels. The results of the filtering and signal level comparisons performed by DSP 62 are summarized in the form of a "symbol detected" result and passed to LP 60.

DSP 62 may require some sample sequences corresponding to a particular channel of interest to be presented to it more than once in order to perform its tone detection function, since the specialized tones recognized by system 50 generally consist of two or more simultaneous tones and the DSP in the preferred embodiment detects only a single tone at any given instant. For example, the DTMF "#" consists of two simultaneous tones (941 Hz and 1477 Hz) and similarly, the DTMF "*" consists of a different DTMF tone pair (1941 Hz and 1209 Hz). Samples of each channel are passed through DSP 62 several times, the number of times being dependent upon the number of frequencies or frequency bands for which power estimates are required. The number of frequencies evaluated in the preferred embodiment for the various specialized tones being detected are as follows:

| Reorigination | 3 or 4 |
| SIT | 4 |
| CCITT No. 5 | 2 or 5. |

The durations as well as the frequencies and amplitudes of each tone in a given tone pair must fall within programmed limits in order for system 50 to determine the tone pair is present. LP 60 upon receiving the test results provided to it by DSP 62 makes sure the detected tones have been "on" the required period of time before it accepts them as "valid." If LP 60 determines that the durations of the detected tones also fall within preprogrammed limits, it informs the external signalling processor (through shared memory 61) of the tone detected and the PCM bus channel on which it has been detected. The external signalling processor then controls the common carrier switch or other equipment to perform appropriate actions in response to the detected tones (e.g., call reorigination, call split, or the like) in a conventional manner as will be understood by those skilled in this art.

THE ARCHITECTURE OF SYSTEM 50

PCM bus 64 is connected to the input of a latch 68, the output of this latch being connected to the data input of input buffer memory 52. The address input of memory 52 is connected to a tristate address bus 70 driven alternately by tristate buffer 72 (connected to an address output of write sequencer 54), tristate buffer 74 (connected to an address output of read sequencer 56), and tristate buffer 76 (connected to the data/address bus of LP 60).

An input buffer memory arbiter 78 enables one (and only one) of tristate buffers 72,74,76 to apply its output onto tristate bus 70—and thereby address buffer memory 52. Arbiter 78 alternately permits: (a) write sequencer 54 to address buffer memory 52 for purposes of writing new PCM bus data into the buffer memory; (b) read sequencer 56 to address the buffer memory for purposes of presenting stored samples of a selected bus channel to DSP 62 for analysis; and (c) LP 60 to address the buffer memory for purposes of permitting the LP to perform various functions not directly related to routine tone detection (e.g., insertion of test data into the memory for diagnostic purposes).

Arbiter 78 enables tristate buffers 72,74,76 in response to requests received from write sequencer 54, read sequencer 56 and LP 60. When contentions for access to input buffer memory 52 arise, read sequencer 56 is given first priority, write sequencer 54 is given priority next, and LP 60 is given the lowest priority. In the preferred embodiment, an access request from read sequencer 56 is serviced immediately (on the next PCM bus cycle) by arbiter 78, a request from write sequencer 54 must be serviced within at most one PCM bus cycle, and requests from LP 60 can wait almost indefinitely (on the time scale of the PCM bus cycles).

Write sequencer 54 and read sequencer 56 operate independently of one another and also independently from LP 60 in the preferred embodiment. In the preferred embodiment, write sequencer 54 is implemented as a sequential state machine which writes to sequential addresses of input buffer memory 52 by addressing the input buffer memory (via tristate buffer 72 and tristate bus 70) and by the enabling PCM bus 64 data onto the input buffer memory input (via latch 68) in response to frame synchronization pulses received from the PCM bus every 125 microseconds (and at a rate timed by a 97 ns system clock).

Read sequencer 56 is also a sequential state machine in the preferred embodiment, but is somewhat more complex because it must read selected channel samples stored in input buffer memory 52 a selected number of times depending upon the type of filtering operation being performed and other variables. Accordingly, read sequencer 56 is controlled by a microcode sequencer/memory 58 in the preferred embodiment (this microcode sequencer/memory actually provides common control of both the read sequencer and DSP 62). Microcode sequencer/memory 58 receives comparison output signals from DSP 62 and controls read sequencer 56 in accordance with those control signals to address appropriate locations in input buffer memory 52 (via tristate buffers 74 and tristate bus 70)—and to enable valid data outputs of the input buffer memory onto the input of DSP 62 (via a latch 80).

Organization of Input Buffer MemorY

Figure 2:
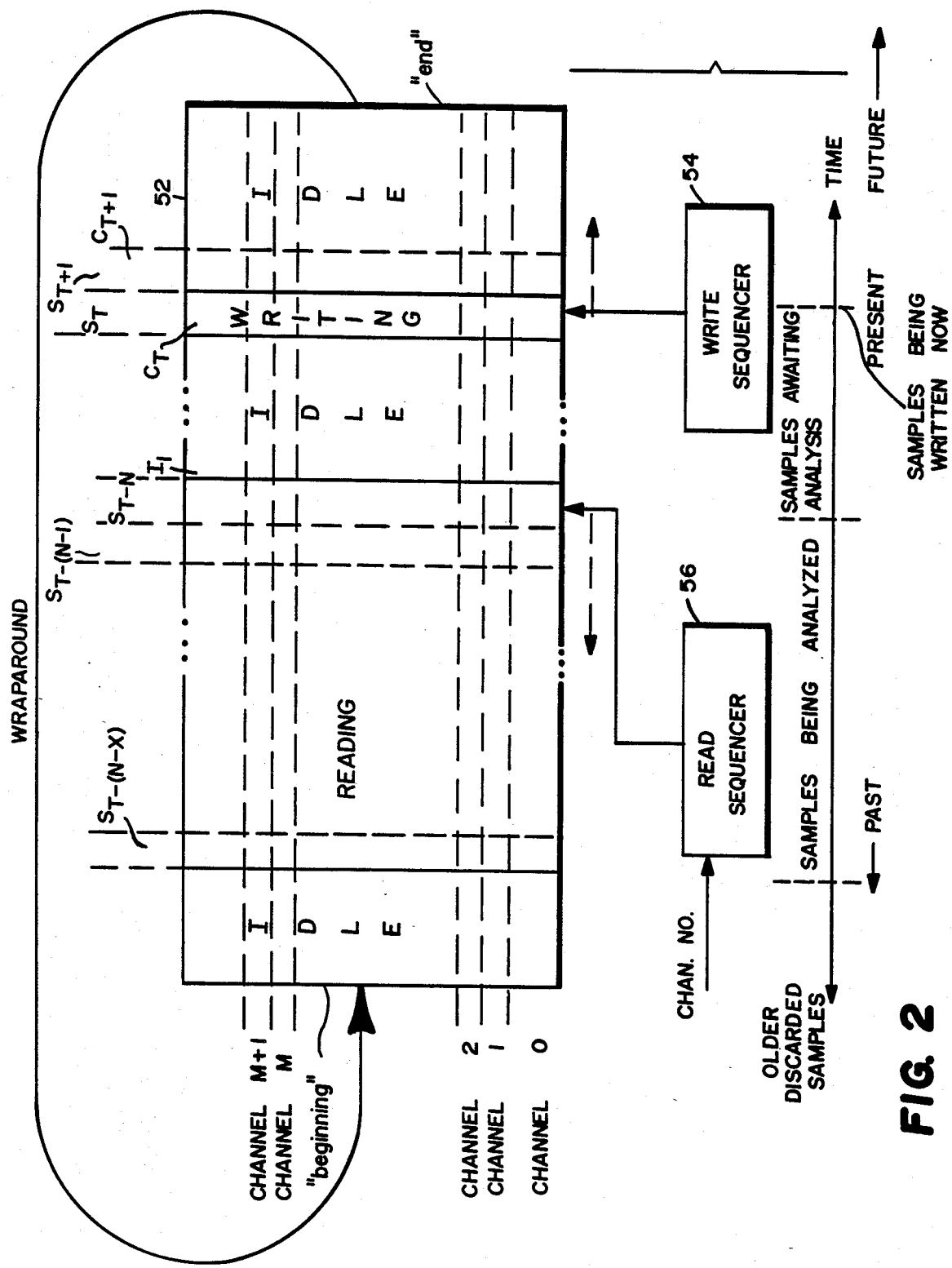

FIG. 2 schematically shows the memory organization of input buffer memory 52 and the manner in which read sequencer 56 and write sequencer 54 read and write data to/from the memory.

The "time line" at the bottom of FIG. 2 divides samples stored in input buffer memory chronologically into four categories: (a) new samples currently being written by write sequencer 54; (b) samples written recently to the memory and awaiting analysis by DSP 62; (c) samples currently being read by read sequencer 56 and analyzed by the DSP; and (d) older, outdated samples that are no longer needed and can be overwritten.

The FIG. 2 memory map of input buffer memory 52 shows a "matrix" of input samples, with rows in the matrix corresponding to PCM bus channel number and the matrix columns corresponding to sample time. That is, all information stored in a given matrix row corresponds to the same PCM channel, and all information stored in a given column corresponds to the same sample time. In the preferred embodiment, write sequencer 54 writes columns while read sequencer 56 reads from all or part of rows. In other words, the write sequencer writes one sample for every channel at approximately the same time, while the read sequencer reads some or all samples corresponding to the same channel at about the same time.

For example, at sample time T, write sequencer 54 writes an entire column $C_1$ of samples $S_T$—which in the preferred embodiment includes a sample for each of the 512 PCM bus channels corresponding to time T. That is, write sequencer 54 deposits into column $C_1$ the samples from an entire PCM bus frame (these samples $S_T$ representing the signal amplitude present on the various PCM bus channels at time T the PCM bus signals were generated through sampling).

After write sequencer 54 is finished writing to column $C_1$, it moves on to column $C_{T+1}$ to write samples $S_{T+1}$ for all 512 PCM bus channels corresponding to sample time (T+1). Write sequencer 54 continues writing sequential columns of data into input buffer memory 52 until it reaches the physical "end" of the memory, at which time it "wraps around" and begins writing columns at the physical "beginning" of the memory. Write sequencer 54 accordingly controls input buffer memory 52 to operate as a circular "wrap around" buffer with the most recent input samples always being written over the oldest input samples stored in the buffer.

In the preferred embodiment, read sequencer 56 reads a time range of samples from a specified row (channel) stored in input buffer memory 52, and reads these samples in reverse chronological order (i.e., beginning from a more recent input sample and ending at an older input sample). For example, read sequencer 56 may be instructed to provide DSP 62 with input samples from a channel M. Read sequencer 56 begins by reading a sample stored for channel M corresponding to a sample time $S_{T-n}$ where $S_T$ is the sample currently being written by write sequencer 54 and n=1 in the preferred embodiment (so that the read sequencer does not attempt to read information that has not yet been stored by write sequencer 54 but instead reads the sample last stored by the write sequencer). After read sequencer 56 reads channel M sample $S_{T-n}$, it reads the channel M sample corresponding to sample time $S_{T-(n-1)}$ (the next oldest stored sample for channel M). Read sequencer 56 continues reading samples in consecutive reverse chronological order until it has read the desired number of samples (e.g., x number of samples, where x=256 in the preferred embodiment). Read sequencer 56 reads samples in reverse chronological order in order to at least initially provide DSP 62 with the most current input samples as has been explained. The filtering operations performed by DSP 62 in the preferred embodiment are time symmetrical, so it does not matter whether samples are presented beginning with the oldest sample or the newest sample (although the sample should be presented in strict chronological order either from oldest to newest or from newest to oldest).

Of course, as read sequencer 56 reads data in reverse chronological order, write sequencer 54 continues to write new columns of samples into the memory. Accordingly, the "idle" area $I_1$ in the memory which contains recent samples awaiting analysis continues to expand in size during the time read sequencer 56 is reading data. Errors in the tone detection process would result if read sequencer 56 were not fast enough to read the oldest sample of interest to it (e.g., $S_{T-(n-x)}$) before that sample was overwritten by write sequencer 54. To prevent such errors from occurring, DSP 62 and read sequencer 56 operate very rapidly, and the size of input buffer memory 52 is sufficiently large to provide enough space for writing new samples before samples currently being read by read sequencer need to be overwritten. In the preferred embodiment, DSP 62 and read sequencer 56 operate rapidly enough (97 cycle time) to permit significant cost reductions to be realized by minimizing the size of the input buffer memory 52 (only 128 kilobytes in size in the preferred embodiment, this rather small size being possible because of the priority structure implemented by arbiter 78—the read sequencer is granted access to the buffer immediately—the very fast analysis performed by DSP 62, and the rapid rate at which data is read by read sequencer 56).

In the preferred embodiment, all channels can be processed by DSP 62 in about 90 to 100 ms for detection of "*", "#" or SIT tones, and in about 4 to 8 ms for CCITT No. 5 signalling. The scanning rate of system 50 is dependent upon the loading presented to it. When no or only a few PCM bus channels are assigned for tone detection, the scan rate can be as fast as 300 microseconds for all channels. When system 50 is commanded to detect "*" and "#" tones on all 512 PCM bus channels, the scan rate slows to on the order of 100 milliseconds. Four filter operations are performed on specified channels to detect "*" or "#" digits and four filter operations are performed on specified channels to detect SIT. For the CCITT No. 5 receivers, two scanning frequencies and three validation frequencies are used.

It will be understood that the memory map shown in FIG. 2 need not correspond to a "snapshot" of the contents of actual "cells" of the input buffer memory with respect to their physical locations in the buffer memory. FIG. 2A is a schematic diagram of the input buffer memory 52 memory map used by the preferred embodiment versus location address. Samples for channels are stored in blocks of contiguous memory locations, with each channel being allocated $1FF_H$ ($512_{10}$) adjacent memory locations (actually 256 locations, as will be explained). Channel allocation blocks begin on 512 byte boundaries. Within a given block allocated to a channel, samples are stored one byte per sample in sequential order from oldest to newest sample—with older samples stored in lower memory addresses and new samples stored in higher memory addresses and every other memory address being unused (in the preferred embodiment these unused memory addresses do not address actual locations of input buffer memory 52 to avoid costly waste of memory space).

Input buffer memory 52 in the preferred embodiment occupies address space $400000_H$–$5FFFFF_H$. However, all active addresses in input buffer memory 52 of the preferred embodiment fall within the address range of $400000_H$–$43FFFF_H$, with every other byte in this address space being unused (for a total of 128K of memory space). Accordingly, the most significant 6 bits of address as well as the least significant address bit can be ignored—leaving only 17 address bits remaining. The most significant 9 bits of these remaining 17 bits selects a channel block, while the least significant 8 of the remaining 17 address bits selects a particular sample within a channel block.

Now that the overall architecture of system 50 has been described in connection with FIG. 1 and the organization of input buffer memory 52 has been described in connection with FIGS. 2 and 2(A), the structure and operation of write sequencer 54, read sequencer 56, DSP 62 and microcode sequencer/memory 58 will be described in greater detail.

WRITE SEQUENCER 54

Figure 3:
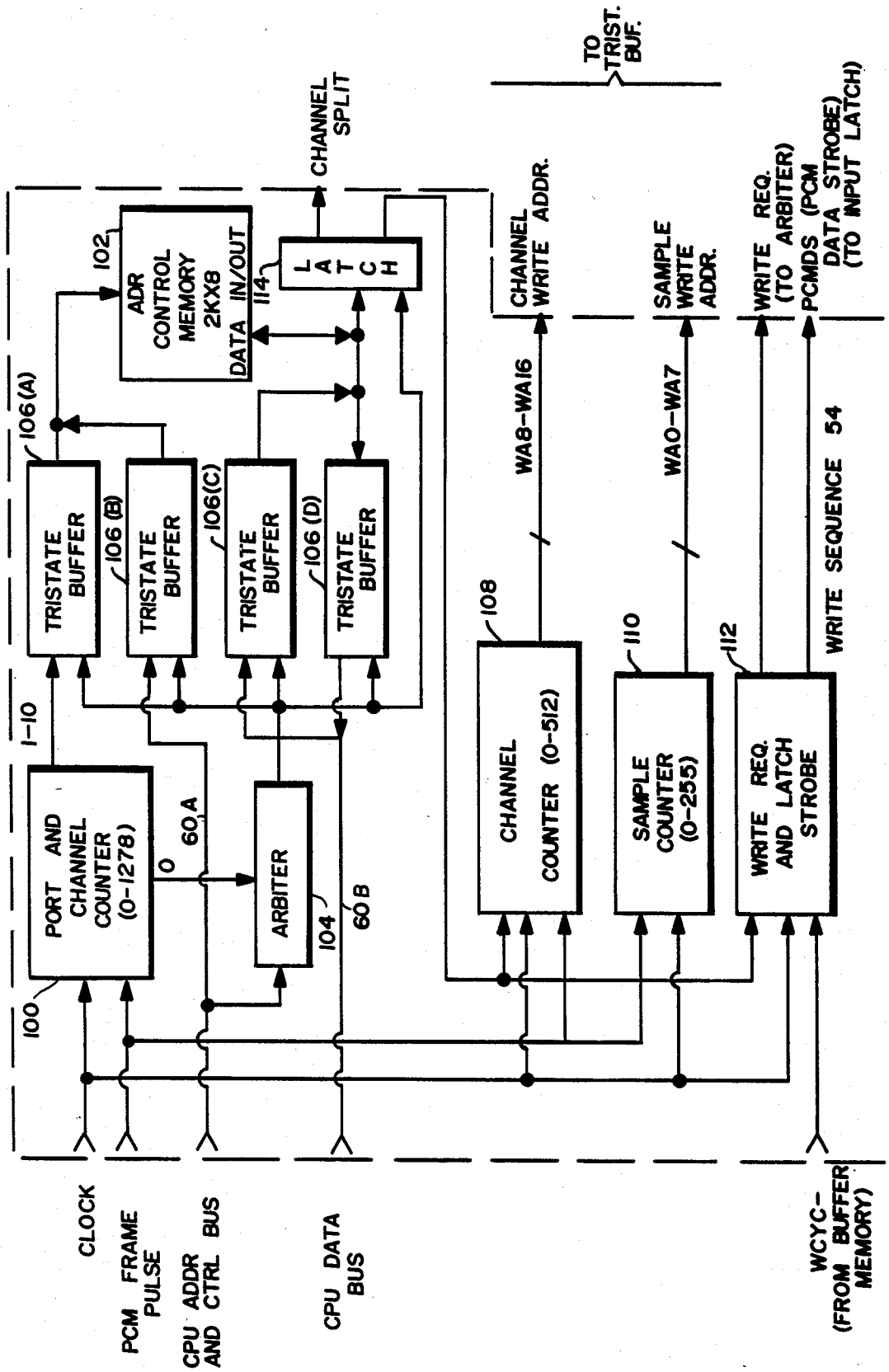
FIG. 3 is a schematic block diagram of the write sequencer shown in FIG. 1.

FIG. 3 is a detailed schematic diagram of write sequencer 54 shown in FIG. 1. Write sequencer 54 includes a port and channel counter 100, a control memory 102, a control memory arbiter 104 and associated tristate buffers 106A–106D, a channel counter 108, a sample counter 110, and a write request and latch strobe 112.

The LP address and control bus 60A is connected to the input of tristate buffer 106(B) (to permit the LP to address control memory 102), and is also applied to the input of arbiter 104. The LP databus 60B is connected to the output side of tristate buffer 106(D) (through which the LP reads data) and also to the input side of tristate buffers 106(C) (through which the LP may write data from its databus to control memory 102). The input of tristate buffer 106(A) is connected to the output of port and channel counter 100, and the address input of control memory 102 is connected to the output of tristate buffer 106A (and also to buffer 106B to permit LP 60 to address the control memory). The data input/output of control memory 102 is applied to both the input of latch 114 and to tristate buffers 106(C) and 106(D).

Arbiter 104 controls tristate buffers 106(A)–106(D) to prevent the port and channel counter 100 and LP 60 from addressing control memory 102 at the same time. In particular, arbiter 104 receives two control signals from LP 60 over the processor address and control bus 60A—CMEMSEL (which indicates that the LP has selected control memory 102) and LPMEMEN (which indicates that the LP has not received a memory cycle from the resource it has addressed). Arbiter 78 also receives a signal LPR/W (the LP read/write control signal).

Arbiter 104 assumes that write sequencer 54 wants exclusive access to control memory 102, and automatically grants control memory access to the write sequencer for every other system clock pulse period dependent entirely on the state of the system clock. Aribiter 104 does, however, occasionally grant control memory access to LP 60—although the priority of LP access with respect to write sequencer access is very low, since the LP can wait for access almost indefinitely on the time scale of the 97 ns system clock.

Arbiter 104 produces various output signals which it applies to the rest of write sequencer 54, control memory 102, and LP address and control bus 60A. Arbiter 104 applies the signals WE and OE to control memory 102, these signals enabling read/write of the control memory and enabling the control memory output, respectively. Arbiter 104 generates a signal WS which grants write sequencer 54 access to read control memory 102, and also generates a signal CDS (control read data strobe) which is used to strobe latch 114. In addition, arbiter 104 generates several signals which it applies to LP address and control bus 60A to indicate when the LP has been permitted to and has successfully written to or read from the control memory, these control signals including LP (LP cycle), LP read and write data enable signals, and LDS (LP data strobe).

Channel counter 108 and sample counter 110 together produce the 17-bit address required to address input buffer memory 52 (via tristate buffers 72 and tristate bus 70). Channel counter 108 produces the higher-order 9 bits of this address (WA8–WA16) to select a stored samples corresponding to a specific channel, while sample counter 110 produces the lower-order 8 address bits (WA0–WA7) used to select a specific sample. Channel counter 108 and sample counter 110 are synchronized to the PCM frame pulse (the active low 125 microsecond synchronization signal used to delineate new frames of the PCM time division multiplexed frame structure), and are clocked by the 97 ns system clock.

In the preferred embodiment, channel counter 108 is cycled through all 512 channels while sample counter 110 keeps a constant value. Sample counter 110 is then incremented to the "next" sample location (i.e., column depicted in FIG. 2), and channel counter 108 is once again cycled through all 512 PCM bus channels. The outputs of sample counter 110 and channel counter 108 are applied in parallel to tristate buffer 72. In addition, the output of sample counter 110 is applied to read sequencer 56 to inform the read sequencer of the most current sample which has been written to input buffer memory 52 (so that the read sequencer can begin reading in reverse chronological order beginning from the most recently written sample.

Write request and latch strobe 112 responds to a signal WCYC produced by input buffer memory 52 upon successful completion of a memory write cycle, and generates the signals required to control latch 68 (e.g., the signal PCMDS which strobes latch 68 to capture incoming data) and a signal WRITE REQUEST which requests arbiter 78 to grant access to the input buffer memory).

Write sequencer 54 performs a mapping process between PCM channels/ports and channel storage blocks within input buffer memory 52. This mapping is based upon a fixed order of reading channels out of input buffer 52 by read sequencer 56. Write sequencer control memory 102 controls the mapping in conjunction with port and channel counter 100.

Port and channel counter 100 counts through all of the ports and channels of PCM bus 64 (this bus being a multiport TDM parallel bus as described above)—so that as PCM bus ports/channels are multiplexed onto the input of input latch 68, the count of the port and channel counter indicates which port/channel is currently applied to the latch input. PCM bus 64 has only 480 active channels of interest to system 50 in the preferred embodiment, but there are actually 640 different PCM bus port/channel combinations. Control memory 102 selects which 480 of the 640 PCM bus ports and channels should be written to input buffer 52.

In the preferred embodiment, control memory 102 includes a storage location corresponding to each bus port/channel. Control memory 102 is preloaded by LP 60 (via tristate buffer 106(C)) such that, for example, all locations corresponding to ports/channels to be written to input buffer 52 store a logic level "1" while all other locations store a logic level "0". Port and Channel counter 100 addresses control memory 102 such that the control memory location addressed at any given time corresponds to the PCM bus port/channel multiplexed onto the input of latch 68 at that time. The control memory 102 data output is connected (via latch 114) to enable/disable the counting of channel counter 108. As the write sequencer 54 counts through the PCM bus ports and channels, it writes into input buffer memory 52 (in sequential channel order) samples for all PCM bus channels in which a "1" is stored in the corresponding memory location of control memory 102. This process results in a "first come first served" ordering of PCM bus port and channel data in input buffer 52—and prevents waste of the memory resources of the input buffer and the processing resources of the write sequencer on PCM bus channels which aren't of interest to system 50.

FIG. 3(A) is a flowchart of the steps performed by write sequencer 54 in the preferred embodiment. The process begins by LP 60 writing "1"s into control memory 102 locations corresponding to PCM bus port/channel combinations which are to be written into input buffer 52 (block 117). LP 60 performs this task by addressing desired locations of control memory 102 via LP address bus 60A (the write sequencer control memory is part of the LP address space in the preferred embodiment), placing the data to be written into those locations onto LP data bus 60B, and requesting control memory writes from arbiter 104 (the LP can subsequently verify the contents of control memory locations by reading via tristate buffer 106(D)). Write sequencer then waits for a PCM frame pulse (block 118) signifying the beginning of a PCM TDM frame.

When a PCM frame pulse arrives, write sequencer 54 resets the counters 100 and 108 and increments sample counter 110 (block 119). A loop including blocks 121-124 is then executed at the 97 ns rate determined by the system clock. The first step in the loop is to read the location of control memory 102 addressed by the current count of port and channel counter 100 (block 121). If the contents of the read control memory location is a "1", then the PCM sample currently multiplexed onto the input of input latch 68 is to be written into input buffer 52 at the input buffer address specified by the current counts of channel counter 108 and sample counter 110—this write being performed by enabling the input latch and applying a WRITE REQUEST signal to arbiter 78 (blocks 122, 123). At the next system clock pulse, the channel counter 108 is incremented to address the next sequential channel block of input buffer 52 (block 124) and port and channel counter 100 is also incremented (block 125). If the contents of the control memory location read by block 121 is not a "1" on the other hand, decision block 122 skips the steps of blocks 123-124 to prevent the corresponding PCM sample from being written into the input buffer 52 but still increments port and channel counter 100 (block 125).

Write sequencer 54 continues performing the loop of blocks 121-125 in synchronization with the system clock until the next PCM frame pulse is received (as tested for by decision block 126)—at which time block 119 resets the port and channel counter 100 and the channel counter 108, and increments the sample counter 110 (the sample counter is incremented to control the write sequencer to write to the next sample time "column" shown in FIG. 2). The loop of blocks 121-125 is then repeated at the system clock rate to write the samples corresponding to the next sampling time (i.e., $S_{T+1}$ shown in FIG. 1) for each of the channels defined as active by the contents of control memory 102.

In the preferred embodiment, write sequencer 54 performs an additional function of channel split control for international CCITT No. 5 tones. In particular, write sequencer 54 generates a signal called "channel split" which shuts off Network Side PIN0-PIN7 data to prevent CCITT No. 5 signals from causing circuit disconnect in IDTC CCITT No. 5 applications. The signal "channel split" is generated at the output of a latch 114 under control of LP 60.

READ SEQUENCER 56

Referring once again to FIG. 1, read sequencer 56 is controlled by microcode generated by microcode sequencer/memory 58, this microcode sequencer/memory also generating microcode to control the operation of DSP 62. Microcode sequencer/memory 58, DSP 62 and read sequencer 56 may thus be regarded as a subsystem of system 50— the function of this subsystem being to read and analyze (in the frequency domain) chronological sequences of samples stored in input buffer memory 52 corresponding to specific channels and tones selected by LP 60.

Since these three blocks function as one subsystem, they will be discussed together. First, the structure and architecture of read sequencer 56, DSP 62, and microcode sequencer/memory 58 will be discussed separately in conjunction with FIGS. 4, 5 and 6, respectively. Then, the overall steps performed by the subsystem will be discussed in connection with the flowchart of FIGS. 7(A)–7(B).

Figure 4:
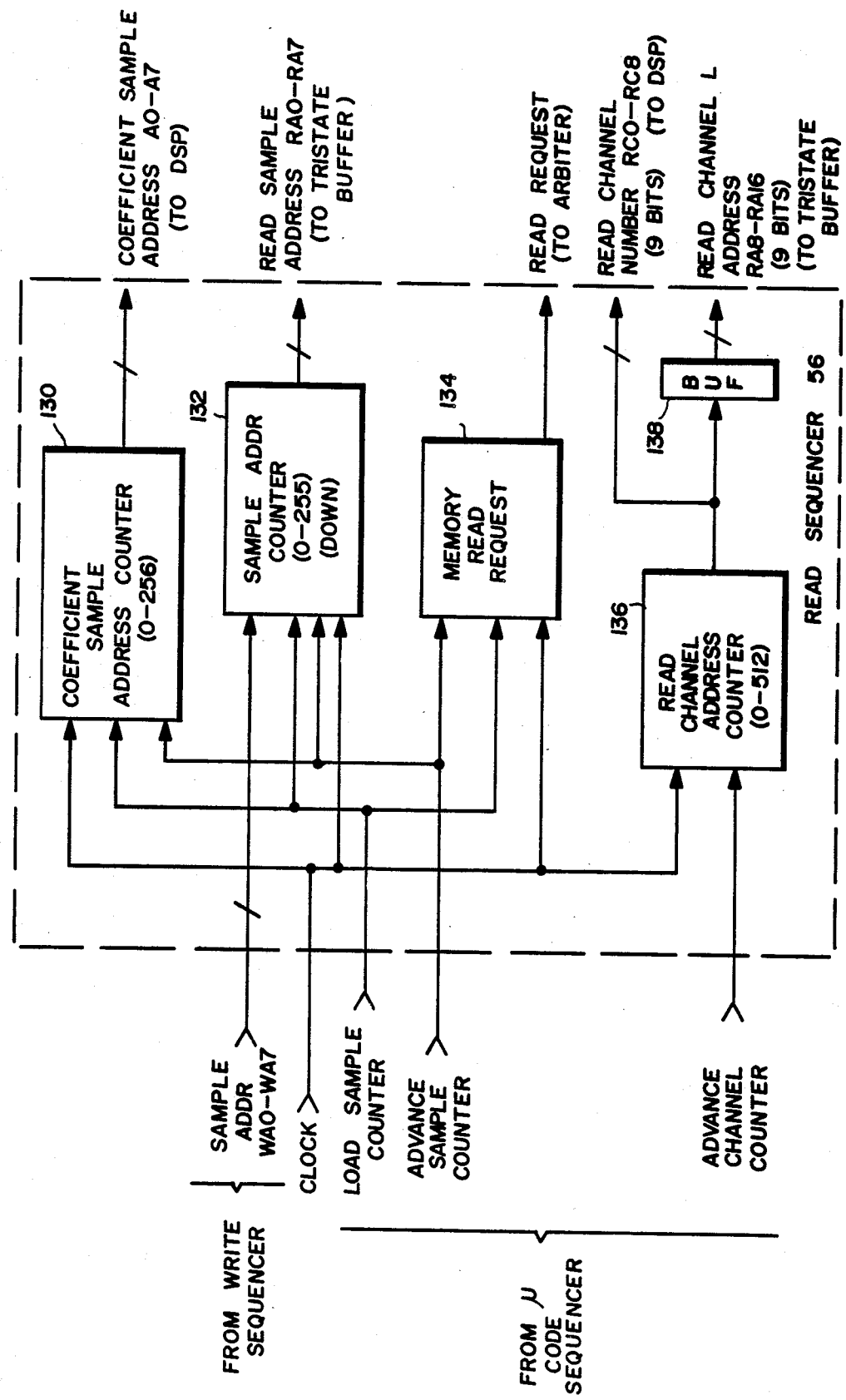
FIG. 4 is a schematic block diagram of the read sequencer/shown in FIG. 1.

FIG. 4 is a detailed schematic block diagram of read sequencer 56 shown in FIG. 1. The read sequencer 54 generates read addresses for input buffer 52, and also generates channel number, code map channel address and sample address information. Read sequencer additionally controls input buffer memory 52 during read operations.

Read sequencer 56 includes a coefficient sample address counter 130, a sample address count-down counter 132, a memory read request generation block 134, a read channel address counter 136 and a buffer 138. Sample address counter 132 and read channel address counter 136 together produce the 17-bit address for input buffer memory 52. In somewhat more detail, sample address counter 132 produces a read sample address specifying the least significant 8 bits RA0-RA7 of the input buffer memory 52 address (specifying a particular sample $S_T$), while read channel address counter 136 specifies the nine most significant bits RA8-RA16 (these nine bits selecting one of the 512 channel blocks stored in input buffer 52). The outputs of read channel address counter 136 and sample address counter 132 are applied to tristate buffer 74 and are enabled onto tristate bus 70 (see FIG. 1) to address the input buffer memory 52. In the preferred embodiment, both of counters 132, 136 respond to the 97 nanosecond system clock, but the sample address counter is decremented in response to microcode signal ADVANCE SAMPLE system clock pulse while the read channel address counter 136 is incremented in response to a microcode signal ADVANCE CHANNEL COUNTER generated by microcode sequencer/memory 58.

At the beginning of a read operation, sample address counter 132 is initially loaded with the sample address output WA0-WA7 produced by write sequencer 54. Sample address counter 132 counts down 256 samples into the past beginning from the sample most recently written by write sequencer 54. Sample address counter 132 is loaded upon instructions issued by microcode sequencer/memory 58 (i.e., a signal called "load sample counter" issued by microcode sequencer/memory 58—this same signal causing memory read request 134 to issue a read request signal to arbiter 78 and also causing the coefficient sample address counter 130 to reset).

Coefficient sample address counter 130 addresses a filter coefficient PROM (PROM 182 which is part of DSP 62 shown in FIG. 5) which steps through prestored coefficients in lockstep with the stepping through of a reverse chronological sample sequence addressed by sample address counter 132. DSP 62 uses the addressed filter coefficients in conjunction with the input sample values to perform power spectrum analysis. Coefficient sample address counter 130, sample address counter 132, memory read request block 134 and read channel address counter 36 are all clocked by the 97 nanosecond system clock and thus operate in synchronism with one another.

DSP 62

Figure 5:
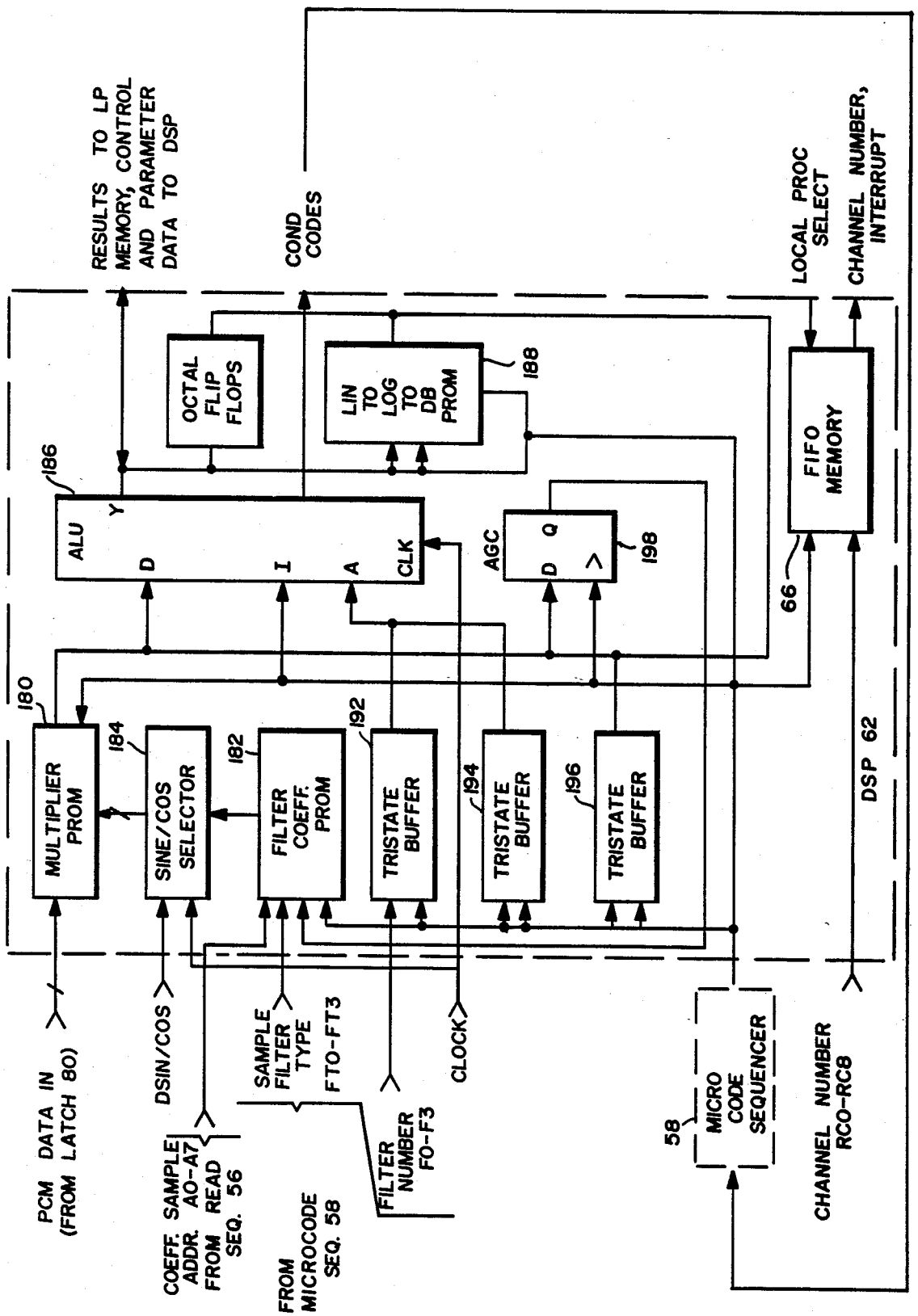
FIG. 5 is a schematic block diagram of the digital signal processor shown in FIG. 1.

FIG. 5 is a schematic block diagram of DSP 62 shown in FIG. 1. DSP 62 filters the chronological tone sample sequence presented to the input of the DSP by read sequencer 56. The results of the filtering process performed by DSP 62 are evaluated first by the DSP itself for level related conditions, and then by LP 60 for timing related parameters. The control signals which control the various portions of DSP 62 are derived from microcode generated by microcode sequencer/memory 58.

DSP 62 includes a multiplier PROM (programmable read only memory) 180, a filter coefficient PROM 182, a sine/cosine selector 184, an arithmetic logic unit (ALU) 186, a linear-to-log-to-dB conversion PROM 188, a FIFO (first in/first out) memory 66, and various tristate buffers 192, 194, 196.

DSP 62 uses look-up tables stored in PROMs 180, 182 and 188 to perform most of the complex calculations required for power spectrum analysis. For example, PROM 188 contains two separate look-up tables—one for converting from a linear power value to a log power value, and another for converting from a log power value to a dB power value. Multiplier PROM 180 includes a lookup table which performs all multiplication of PCM input values by sine and cosine filter coefficients stored in PROM 182—so that ALU 182 performs only summation and comparison functions and no time-consuming multiplication or division functions in the preferred embodiment. This architecture increases the speed of DSP 62.

Multiplier PROM 180 effectively multiplies two PCM values together—a 7-bit value contained within latch 80 (and recently read from input buffer 52 by read sequencer 56) and a 3-bit value produced by filter coefficient PROM 182 (the resulting 10-bit value is used to address PROM 180 in the preferred embodiment). Filter coefficient PROM 182 contains filter reference coefficients for 256 filters in groups of sixteen filters in each of sixteen different filter types. This filter coefficient PROM is addressed by a 4-bit sample filter type value FT0-FT3 produced by microcode sequencer/memory 58, by a 4-bit filter number FN$\phi$-FN3, and also by an 8-bit coefficient sample address value A0-A7 produced by read sequencer 56 in lockstep with the addressing of input buffer memory 52. Sine/cosine selector 184 is a multiplexer in the preferred embodiment which selects between a 4-bit sine coefficient and a 4-bit cosine coefficient stored in filter coefficient PROM 182 such that a sine coefficient and its corresponding cosine coefficient are addressed and outputted from the coefficient PROM (182) simultaneously, and selectively applied to the multiplier PROM (180) under microcode control.

ALU 186 in the preferred embodiment consists of a 7C9101-31 16-bit off-the-shelf arithmetic logic unit (equivalent to four 2901 4-bit ALUs and a 2902 carry look ahead device connected together). ALU 186 performs mathematical operations involved in the digital signal filtering performed by DSP 62. In particular, ALU performs accumulation and conversion tasks and cooperates with microcode sequencer/memory 58 to perform comparison tests. Linear-to-log-to-dB PROM 188 performs conversion of linear sine and cosine power estimates accumulated by ALU 186 into a dBm power estimate. This resulting power estimate is used by DSP 62 to compare the frequency component levels to one another and to preset thresholds. Buffers 192–196 allow DSP 62 to operate as a pipelined system and also allow multiple address and data sources for ALU 186.

FIFO memory 66 provides an interrupt queue between DSP 62 and LP 60. FIFO memory 66 is loaded by DSP 62 with the channel number of the channel being evaluated when DSP 62 has detected a tone on that channel. FIFO memory 66 causes an interrupt to be generated to interrupt LP 60, and points to an address in a shared memory (part of LP 60 in the preferred embodiment) in which DSP 62 has deposited the symbolic results of the filtering process. FIFO memory 66 allows ALU 186 to operate at a 97 nanosecond cycle rate and yet still pass data to the much slower LP 60 (which in the preferred embodiment operates at approximately a 1 microsecond cycle rate).

MICROCODE SEQUENCER/MEMORY 58

Microcode sequencer/memory 58 controls read sequencer 56 and DSP 62. FIG. 6 is a schematic block diagram of microcode sequencer/memory 58. The microcode sequencer/memory 58 includes microcode memory 152, an off-the-shelf microcode sequencer 154 (a 29C1φA integrated circuit in the preferred embodiment), latches 156,158, a map address latch 160, a multiplexer 162 and a demultiplexer 164. Microcode sequencer 154 receives various signals to help it perform its function, including the 97 nanosecond system clock, the current microcode being outputted to the DSP 62 arithmetic logic unit 182, and various conditional test selection outputs produced by DSP 62 and LP 60. In addition, LP 60 produces a code map which is applied to map address latch 160 and addressed by DSP 62 to control the selection performed by multiplexer 162.

Microcode sequencer 154 addresses (via latch 156) words of microcode memory 152 (an EPROM in the preferred embodiment), these words producing control signals used to control DSP 62 and read sequencer 56, and also selecting (in conjunction with test result outputs produced by DSP 62 and the code map specified by LP 60) the next address to be read from the microcode memory. Those skilled in the art will understand that microcode sequencer/memory 58 operates as a conventional sequential state machine microcode controller in a well-known manner.

The microcode generated by microcode sequencer/memory 58 and used to control system 50 provides the following signals:

1. DSP ALU instructions and control
   a. ALU 182 instructions I0 through I8 (9 bits)
   b. ALU 182 addresses A0 through A3 and B0 through B3 (8 bits)
   c. Address source selection (filter address/microcode) (1 bit)
   d. Data source selection (2 bits)
      (1) Multiplier power/filter selection (1 bit)
      (2) ALU immediate data (from jump data and A address)—note bit reuse
      (3) DSP to LP memory address generator controls ASEL0, ASEL1, FP0 (3 bits)
      (4) DR/W—DSP read write control
2. Microcode sequencer instructions and control
   a. Sequencer instructions I0 through I3 (4 bits)
   b. Sequencer data D0 through D11 (12 bits)
   c Condition select CS0 through CS3 (4 bits)
   The conditions selected include the following
   (1) Pass
   (2) Fail
   (3) F15 (sign)
   (4) EQO (zero)
   (5) OVR (overflow)
   (6) C15 (carry from the most significant bit)
   (7) AGC (the result of the AGC calculation on input level)
   (8) Pass
   (9) Pass
   (10) FHF (FIFO half full)
   (11) Pass
   (12) Pass
   (13) Pass
   (14) DCP (DSP continue pending)
   (15) DER (DSP cycle error)
   (16) FIFUL (FIFO full)

Some of the above conditions also have acknowledges that are available when the condition is selected. The acknowledges are:

1. DEA (DSP error acknowledge) Miscellaneous control strobes
   (a) Idle
   (b) LCD (load code data)
   (c) PAGE0 (set microcode page to 0)
   (d) ALUDSTE (ALU data strobe)
   (e) SINDBSTB (sine dB data strobe)
   (f) COSSTB (cosine data strobe)
   (g) AGCSTB (AGC data strobe)
   (h) LFT (load filter type)
   (i) DCR (DSP cycle request (to LP main memory arbiter))
   (j) LDS (local processor data strobe)
   (k) PAGE1 (set microcode page to 1)
   (l) ERR (error interrupt to local processor)
   (m) LPI (interrupt to local processor (results))
   (n) Advance sample counter
   (o) Load channel counter
   (p) Advance channel counter All of the above are mutually exclusive, and are encoded as four select bits in the preferred embodiment.

LOCAL PROCESSOR 60

LP 60 in the preferred embodiment is a conventional Motorola 68000 microprocessor provided with 128 Kbytes of random access memory and 128 Kbytes of EPROM, along with various associated conventional peripheral devices including a random access memory, a 68901 multifunction peripheral "MFP" (providing timers, an asynchronous serial interface, and input, priority, and masking interrupt capabilities), a shared memory arbiter, an address decoder and a Dtack generator, a clock oscillator (20.48 MHz divided to 10.24 MHz in the preferred embodiment), a watchdog timer, a bus error timer, assorted buffers, a power-up reset circuit, and an RS-232 driver and receiver. The structure and operation of the microprocessor and peripheral arrangement included in LP 60 are conventional and well known to those skilled in the art.

LP 60 updates the code map stored in its own memory on command from the external signalling processor (i.e., assigns appropriate filter numbers to applicable channels). In particular, LP 60 assigns receivers (i.e., commands DSP 62 and microcode sequencer/memory 58 via code map data to read and analyze samples of particular channels for particular signalling tones) in response to requests applied thereto by an external signalling processor/switch via a shared memory 61. Requests from the external signalling processor state PCM bus port number and channel, and receiver type (i.e., the type of tone to be detected). LP 60 subsequently collects DSP 62 evaluation results and analyzes the results in the time domain (for duration and consistency with receiver assignment). LP 60 returns final evaluated results to the external signalling processor through shared memory 61 (via an interrupt and scan driven process including a report queue in the preferred embodiment). LP 60 also receives instructions (e.g., the new receiver assignments and channel assignments) from the external signalling processor via a control queue (also implemented in the shared memory). LP 60, in addition, performs various error handling and diagnostic functions.

OPERATION OF THE SAMPLE READ/ANALYZER SUBSYSTEM

DSP 62 performs several functions on incoming PCM sample data presented to it by read sequencer 56 in order to determine whether tone frequencies specified by the code map maintained by LP 60 are present in the incoming data. The functions performed by DSP 62 include correlation, filtering (using a Modified Hilbert Transform in the preferred embodiment), linear-to-dB conversion, and threshold comparison. This overall process—including the steps performed by DSP 62 and read sequencer 56 under control of microcode sequencer/memory 58 and the role of LP 60 in this process—is schematically shown in the flowchart of FIGS. 7(A)-7(B).

To filter the incoming PCM digital sample signals, the DSP 62 performs a Modified Hilbert Transform of the type known to those skilled in the art. Briefly, this process involves heterodyning (multiplying) the incoming signals with sine and cosine reference frequency coefficients. The resulting products are then filtered by a lowpass filter (built into the sine and cosine reference frequency coefficients in the preferred embodiment) and accumulated by DSP ALU 186. The result generally represents a power level of a specific frequency of interest present in the input signal.

Coefficient storage and multiplication is performed by filter coefficient PROM 182 and multiplier PROM 180 in the preferred embodiment. The incoming sample presented to DSP 62 by read sequencer 56 and the local reference coefficients are used together to address multiplier PROM 180. Corresponding 8-bit outputs produced by multiplier PROM 180 in response to these addresses are then accumulated in two 16-bit registers with in DSP ALU 186 (one register for the sine result and the other register for the cosine result) along with the results from the other (15 or 191) samples being processed for that channel. Each multiplication in the preferred embodiment is completed within 97.6 nanoseconds, with alternate clock periods being used for setup (and for writing into input buffer memory by write sequencer 54). The filtering operation, which processes 256 samples, takes $(256 \times 2 \times 97.6 \text{ ns}) = 50$ microseconds to perform.

A total of 256 frequencies are programmed into multiplier PROM 180 and filter coefficient PROM 182. These frequencies are selected by the code map (generated by LP 60) which contains the filter numbers for the various channels of interest. The code map (which is a segment of the main memory of LP 60 in the preferred embodiment) is updated by the LP on command from an external control system, and portions of the code map of interest to DSP at particular times are latched into microcode sequencer/memory map address latch 160.

The first step performed is to reset various portions of system 50 upon initial application of power to the system so that the system is initialized and ready for digital signal processing (block 300 FIG. 7(A)). The reset processing in the preferred embodiment includes initializing the microcode sequencer/memory 58 and also the various memory tables maintained by LP 60 (i.e., the parameter map, the results map, and the code map). Initialization of microcode sequencer/memory 58 is accomplished by performing a "Jump to Zero" in microcode sequencer 154 after power-up, followed by executing microcode which clears the various registers and initializes the various counters of microcode sequencer 154 and DSP 62. Microcode sequencer/memory 58 then executes microcode that writes zeros to the parameter map, results map and code map maintained by LP 60. This code initializes the stack, program counter and register counter within microcode sequencer 154, and also initializes the registers of DSP ALU 186 (in addition to initializing map address RAM 160). The counters within write sequencer 54 and read sequencer 56 are self-initialized by conventional power-on reset circuits. LP 60 initializes the write sequencer control memory 102 and input buffer memory 52 upon power-up.

Once system 50 has been initialized, the next step is to obtain the Code Map Data for the next channel to be processed, and to jump to the appropriate microcode to process the data (blocks 302,304 of FIG. 7A). Microcode sequencer/memory 58 requests the code map from LP 60—this code map specifying the channel on which tone detection is desired and the specific signalling tones to be detected on the channel. When LP 60 has responded with a current code map (i.e., by loading the code map into map address latch 160), microcode sequencer 154 jumps to a location in microcode memory 152 specified by the code map (block 304) and begins executing microcode at that address in the memory.

Sometimes the LP 60 will direct microcode sequencer/memory 58 to execute a "no operation" ("NOP") section of microcode. The NOP command permits DSP 62 and LP 60 to ignore idle PCM channels, thus reserving processing sources for those channels that need them. NOP microcode is executed for all filter types other than those which have defined signal sets and microcode.

Assuming that the code map loaded by LP 60 commands microcode sequencer/memory 58 to perform filtering operations on a particular channel, the first part of the filtering operation which is performed in the preferred embodiment is a correlation (Modified Hilbert Transform) function. This correlation function is performed by blocks 308–324 in the preferred embodiment.

Block 308 first clears the sine and cosine accumulation registers within DSP ALU 182, and then loads read sequencer sample address counter 132 and coefficient sample address counter 130. Read sequencer 56 then requests access to input buffer memory 52 from arbiter 78, and once access is granted, loads the first address sample (which in the preferred embodiment is the sample most recently written by write sequencer 54) into latch 80. DSP 62 processes this sample through multiplier PROM 180, filter coefficient PROM 182 and sine/cosine selector 184, and then stores the results in internal accumulator registers of ALU 186. In particular, filter coefficient PROM 182 is addressed to obtain the sine and cosine filter coefficient pair corresponding to the first sample in the sequence, sine/cosine selector 184 is controlled to select the sine coefficient, and multiplier PROM 180 generates the product of the PCM data sample and the sine coefficient which is then summed into ALU sine accumulator register; and then the sine/cosine selector is controlled to select the cosine filter coefficient and the process is repeated to sum the product of the PCM data sample and the cosine coefficient into a cosine accumulator register with an ALU 186. The process of summing the products into the ALU accumulation registers is used instead of an overwriting process in the preferred embodiment—that is, the sine coefficient product is added to the previous contents of the sine accumulator register, and the consine coefficient product is added to the previous contents of the cosine accumulator register (block 310).

The sample address counter 132 within read sequencer 56 is then decremented (block 318) and the coefficient sample address counter 130 is incremented (block 320).

Blocks 308-320 are performed repeatedly for each sample to be processed (as tested for by block 322).

Once all of the samples on a given channel have been processed through a first filtering process, the results stored in the ALU 186 accumulator registers are converted to dB from the linear form they are calculated in (block 326).

After each filtering operation is completed by DSP 62, the accumulated sine and cosine components of the power level stored within the two ALU 16-bit registers are read and passed through linear-to-log-to-dB PROM 188 to determine the corresponding power level in dBm (block 326). The power is calculated from the following relationship in the preferred embodiment:

$$\text{Power} = 10 \log (a^2 + b^2)$$
$$= 10 \log (10^{(2 \log a)} + 10^{(2 \log b)}).$$

To obtain the power level, only two variables need to be known—namely log (a) and log (b). The two 16-bit numbers stored in the ALU accumulator registers are truncated in the preferred embodiment to fourteen bits and are then converted to log form (7 bits) by PROM 188. The two 7-bit log numbers (log (a) and log (b)) are latched and presented to the same PROM 188 as addresses but with the most significant address bit set for log-to-dB conversion. PROM 188 then outputs the corresponding dB power level (in 0.25dB steps, with the value 00H corresponding to +3.75dBm).

In somewhat more detail, the contents of the sine accumulator ALU register is applied to the address input of PROM 188 (along with a higher order address bit specifying that the Linear to Log lookup table portion of the PROM is to be addressed) and the resulting PROM data output is stored into the ALU accumulator register. This process is repeated for the cosine accumulator register contents. The result of this sequence of steps is to store the converted log sine and cosine power values (each 7 bits long) in the two registers of ALU 186. These two values are then concatenated to form a single 14 bit address which is used to address the log to dB lookup portion of PROM 188, and the resulting PROM data output (8 bits long) is once again stored into a register of ALU 186.

In the case of the first filter performed on a channel (decision block 328), the dB power estimate is compared with a minimum threshold set in the LP code map (decision block 330)—since this first filter measures the total power contained in the channel for AGC purposes in the preferred embodiment. If the total signal power is below the threshold (e.g., −28dBm), an AGC flag (i.e., flipflop 198 shown in FIG. 6) is set (block 332). The effect of setting the AGC flag is to amplify the incoming signal by 18dBm for subsequent filter measurements on that specific channel and set of samples. This AGC function improves the accuracy of the filtering operation for low level signals. The remaining three filters are set by LP 60 (via a code map) according to the particular receiver type to be used for that channel.

If the result being converted is an overall power estimate, AGC latch 198 is strobed to sample the most significant bit of the dB value. Otherwise, if the AGC flag is set, 18dBm is subtracted from the resulting value to normalize it.

Blocks 304-328 are then repeated as necessary to complete the power spectrum analysis required for a specific filter type. In the preferred embodiment, the 256 samples of a channel are filtered four times for detection of "*" or "#" DTMF tone pairs (and are also filtered four times for SIT detection). For the CCITT No. 5 tone detection feature, DSP 62 initially processes sixteen samples from the channel through two wideband energy detection filters. If there is energy in the highband (2200–2800 Hz) and not in the low or guardband, then data from the channel is processed through a more selective 192-sample filtering process similar to that used for detection of "*" and "#" DTMF tone pairs.

When the last repetition for a particular filter has been completed (decision block 334), DSP 62 evaluates the resulting dB power levels of the input signal frequencies with respect to standards for each signalling set or filter type (decision block 336). In particular, the results are compared to a 16 bit threshold in dB supplied by the LP code map by controlling ALU 182 to subtract the threshold from the power estimate value and determining the sign of the result. Threshold comparisons are repeated as necessary by the signal recognition process—typically not more than 6-8 times.

If the comparison process reveals that a signalling tone does exist on the channel of interest (i.e., if the power estimate levels are within the predetermined amplitude specifications specified by the LP code map), the results are written to the shared internal memory of LP 60 (block 342) by depositing the test results in a corresponding Results Map location in the shared LP memory. Finally, the channel number on which tone signalling has been detected is placed into FIFO memory 66 for communication to LP 60 (block 340) and the LP is interrupted. The read channel value placed into FIFO memory 66 points to the location in the results map —and by virtue of the Port and Channel mapping process, to the actual Port and Channel number of PCM bus 64. LP 60 validates this information in the time domain. If the LP 60 determines that a particular tone has been "on" at least a required duration, it notifies the external signalling processor of the tone type and the PCM channel and port number for appropriate action.

As will be understood, the same channel can be and typically is evaluated for more than one different signalling tone. In such a case, blocks 304-340 may be executed first for one tone and then for another tone.

When all necessary tests have been performed for a particular channel and filter type, the channel number is incremented (block 342)—meaning in the preferred embodiment that the read channel address counter 136 of read sequencer 56 is loaded with a new channel value—and steps 302-342 are repeated for the new channel.

As already mentioned, the preferred embodiment supports the following receiver types:

Reorigination (DTMF "*" or "#" receiver which is assigned after call cut through and remains active during the talking state for the duration of the call, on the originating side of the call);

SIT (special information tones receiver which detects the tones which precede a recorded announcement and is assigned after call cut through and remains active until answer supervision is declared); and CCITT No. 5 (this receiver detects circuit supervision on international circuits, and is active as long as the channel is defined as requiring a No. 5 receiver).

System 50 detects DTMF Reorigination "#" (pound) and "*" (asterisk) digits having a duration greater than or equal to the programmed office parameter (provided that minimum amplitude, frequency deviation and amplitude twist conditions comply with CCITT Recommendations.. The following frequency and duration parameters are specified by LP 60 via its code map in the preferred embodiment for the "#" and "*" reorigination digits:

| Frequencies | Digits | Duration |
|---|---|---|
| 941 Hz + 1477 Hz | DTMF (#) | Programmable from 0.8 sec to 25.4 sec in 0.1 sec steps +0.1 sec −0.0 Sec |
| 941 Hz + 1209 Hz | DTMF (*) | Programmable from 0.8 sec to 25.4 sec in 0.1 sec steps +0.1 sec −0.0 Sec |
| DTMF CCITT RECOMMENDATIONS | | |
| MINIMUM AMPLITUDE PER TONE | | |
| Must Accept | | −25 dBm |
| Must Reject | | −35 dBm |
| FREQUENCY DEVIATION | | |
| Must Accept | | + or − 1.5% FO |
| Must Reject | | + or − 3.5% FO |
| AMPLITUDE TWIST HIGH BAND WITH RESPECT TO LOW BAND | | |
| Must Accept | | +4 dB to −8 dB |
| Must Reject | | +9 dB to −13 dB |
| (NOT CCITT RECOMMENDED) MAXIMUM AMPLITUDE PER FREQUENCY | | |
| Must Accept (NO CCITT RECOMMENDATION) MAXIMUM AMPLITUDE IN AUDIO PASSBAND | | −3 dBm |
| Must Accept (NO CCITT RECOMMENDATION) | | −0 dBm |

Due to the nature of the signals being detected and the finite number of samples processed to make a determination as to the actual signal present, a fairly large variation is allowed in the preferred embodiment between the "must accept" and the "must reject" levels. This variance takes into account the time varying nature of the signals, the fact that more than one form of distortion or noise may be present, and the fact that more than one of the parameters may be near its acceptance limit at any given instant.

Detection of Special Information Tones (SITs) is in the preferred embodiment assured if the following parameters are met:

1. Sequence The tones must be presented to system 50 in an ordered sequence of three. The sequence consists of a tone from the low frequency group, followed by a tone from the intermediate group, which is followed by a tone from the high frequency group.

2. Duration The minimum duration for each of is 260 ms, according to CCITT.

3. Frequency Frequency limits for each of the tones are, from CCITT recommendations:

| | |
|---|---|
| Low Frequency | 950 Hz + or − 50 Hz |
| Intermediate Frequency | 1400 Hz + or − 50 Hz |
| High Frequency | 1800 Hz + or − 50 Hz |

For example, an exemplary conventional Digital Recorded Announcement Unit (which may be connected into the same telephone network as system 50) uses the following frequencies to identify a phrase ID:

| | |
|---|---|
| 913.8 Hz | |
| 985.2 Hz | Low Frequency Group |
| 1370.6 Hz | |
| 1428.5 Hz | Intermediate Frequency Group |
| 1776.7 Hz | High Frequency |

An example of an ordered sequence which may be present on PCM bus 64 is: 913.8 Hz for 288 ms, followed by 1428.5 Hz for 384 ms, and followed by 1776.7 Hz for 288 ms.

System 50 can detect the SIT in the preferred embodiment but does not classify the SIT as to message type. Detection allows immediate credit for a user whose call terminates to a recorded announcement preceded by an SIT.

Detection of CCITT No. 5 Signalling tones will occur in the preferred embodiment if the incoming tones meet the following criteria:

1. Frequency:
   a. 2400+/−15 Hz
   b. 2600+/−15 Hz
2. Level: −2 to −16 dBm
3. Twist: +/−5 dB
4. Noise Level: −40 dBm Tones will be rejected if they:

1. Fall outside the following frequency ranges:
   a. 2400−150+100 Hz
   b. 2600−100+150 Hz
2. Are less than −26 dBm in amplitude
3. Have more than −30 dBm energy in the guard band region (300 to 2100 Hz)
4. Have excessive Twist for two tone signals (greater than +.−10 dB).

Tones meeting the above criteria will be detected within 20 milliseconds of arrival. The circuit split will be operative within 15 milliseconds of signal detection, or within 35 milliseconds of arrival.

Performance of System 50

The main limitations on the performance of system 50 are the number of different frequencies that can be simultaneously detected or monitored, and the closeness of those frequencies to one another. The number of frequencies is limited by the need to process the channels in input buffer 52 at least once each 100 milliseconds. This requirement combined with a filtering process that takes 50 microseconds per frequency per channel implies that if all 512 channels are active, then no more than 4 filters (including the overall power filter) may be active on any particular channel. This is an average limitation—so that for every channel that uses no filters another channel could use eight filters and so forth. The closeness of the different frequencies to one another is limited by the filtering process used, and in the preferred embodiment this requires that different frequencies be separated by at least 80 Hz.

System 50 provides 5 call originations per second for reorigination receivers at 480 Erlangs at busy hour (monitoring only)—with all 480 active speech channels being monitored simultaneously for a "*" and "#" symbols. Since in typical systems SIT tone detection and reorigination tone detection are mutually exclusive in need and assignment, SIT and reorigination filter types are never assigned to the same channel at the same time. System 50 can thus provide detection of SIT or reorigination signalling tones (or any combination of the two) for all 480 channels simultaneously. As a mutually exclusive per trunk option, system 50 can provide up to 480 channels of CCITT No. 5 tone detection.

The probability of digit misinterpretation due to a single end to end signalling digit is based on a normalized Maxwell distribution that is translated. The distribution is translated such that for a digit duration 'x' less than or equal to a digit duration 'b', where b=0.04 seconds, the probability of misinterpretation is equal to zero (i.e., $P(x<=b)=0$). The mean of the distribution is 0.3 seconds.

The following table sets forth the probability a misinterpretation for a single digit duration:

| Digit Duration (Xn) | Probability P (X > Xn) |
|---|---|
| .05 sec | 8.41E-2 |
| 0.78 sec | 3.54E-4 |
| 0.9 sec | 1.32E-5 |
| 1.0 sec | 5.54E-7 |
| 1.1 sec | 1.58E-8 |
| 1.2 sec | 3.0E-10 |

While the invention has been described in connection with what is presently considered to be the most practical and preferred embodiment, it is to be understood that the invention is not to be limited to the disclosed embodiment but rather is intended to cover various modifications. For example, other design alternatives for the digital signal processor might include FFT signal filtering, DCT filtering, FIR filtering, IIR filtering, a hardwired sequencer controlling an arithmetic arrangement, use of microcontroller based signal validation logic, use of other bit slice ALUs and microprogram sequencers, and use of gate arrays or other custom silicon to perform various functions—to name a few. The performance of the preferred embodiment was maximized by using a bit slice ALU and microprogram sequencer to perform the frequency domain (signal level) evaluations on each channel and only reporting to the local processor those channels whose signals pass this validation test. However, all equivalent arrangements are intended to be included within the spirit and scope of the appended claims.

What is claimed is:

1. A specialized tone receiver of the type which is connected to a digital signal bus carrying a pulse code modulated digital signal sample stream corresponding to a speech channel, said receiver comprising:

input buffer memory means for temporarily storing said bus digital signal sample stream;

write sequencer means connected to said memory means and also connected to receive said signal sample stream for writing said sample stream into said input buffer memory means in a first sequential chronological order;

read sequencer means connected to said memory means for reading said written sample stream from said memory means in a second sequential chronological order opposite said first chronological order; and digital signal processing means connected to receive said read sample stream for detecting at least one prespecified frequency component within said sample stream.

2. A receiver as in claim 1 wherein said read sequencer means reads said sample stream from said memory means in reverse chronological order beginning with a sample in said stream corresponding to a sample time T−1 substantially while said write sequencer means continues to write said sample stream into said input buffer memory in chronological order beginning with a sample in said stream corresponding to a sample time T.

3. A receiver as in claim 1 further including memory arbiter means connected to said read sequencer means, said write sequencer means, and said memory means, for alternately granting access to said memory means by said read sequencer means and said write sequencer means in accordance with a predetermined priority structure, said priority structure awarding said read sequencer means a higher priority than said write sequencer means.

4. A receiver as in claim 1 wherein said digital signal processor means includes means for filtering said read sample stream using a filtering algorithm which is symmetrical with time.

5. A specialized tone receiving apparatus of the type which is connected to a time division multiplexed digital signal bus carrying time division multiplexed pulse code modulated plural digital signal sample sequences corresponding to associated plural independent speech channels, said apparatus comprising:

input buffer memory means for temporarily storing said bus digital signal sample sequences;

write sequencer means connected to said memory means and also connected to said digital signal bus for writing said plural digital signal sample sequences into said input buffer memory means, the sequence of samples corresponding to each of said plural independent speech channels being written into said memory means in a first sequential chronological order;

read sequencer means connected to said memory means for selecting one of said plural independent speech channels and for reading the signal sample sequence corresponding to said selected speech channel from said memory means in a second sequential chronological order opposite said first chronological order; and digital signal processing means connected to receive said read signal sample sequence for detecting at least one prespecified frequency component within said read signal sample sequence.

6. Apparatus as in claim 5 wherein:
said write sequencer means includes a first channel counter means for maintaining a first channel count, a first sample counter means for maintaining a first sample count, and means for addressing said memory means in accordance with said first channel and sample count;
said write sequencer means includes a second channel counter means for maintaining a second channel count, a second sample counter means for maintaining a second sample count, and means for addressing said memory means in accordance with said second channel and sample count; and
said apparatus further includes means for loading the contents of said first sample counter means into said second channel counter means.

7. Apparatus as in claim 5 wherein:
said write sequencer means includes a first channel counter means for maintaining a first channel count, a first sample counter means for maintaining a first sample count, and means for addressing said memory means in accordance with said first channel and sample count;
said write sequencer means includes a second channel counter means for maintaining a second channel count, a second sample counter means for maintaining a second sample count, and means for addressing said memory means in accordance with said second channel and sample count; and
said apparatus further includes means for periodically incrementing the contents of said first sample counter means and means for periodically decrementing the contents of said second sample counter means.

8. Apparatus in claim 7 wherein:
said first-mentioned incrementing means increments the contents of said first sample counter means at a first rate;
said decrementing means decrements said second sample counter means at a second rate; and
said method further includes:
means for incrementing the contents of said first channel counter means periodically at a rate which exceeds the first rate, and
means for incrementing the contents of said second channel counter means periodically at a rate which is less than the second rate.

9. A specialized tone receiver of the type which is connected to a digital signal bus carrying a pulse code modulated digital signal sample stream corresponding to a speech channel, said receiver comprising:
input buffer memory means for temporarily storing said digital signal sample stream;
write sequencer means connected to said memory means and also connected to receive said digital sample stream for writing said digital signal sample stream into said input buffer memory means in a sequential chronological order;
read sequencer means connected to said memory means for reading said written digital signal sample stream from said memory means more than once; and
digital signal processing means connected to receive said read digital signal sample streams for detecting a first prespecified frequency component within said read digital signal sample stream the first time said read sequencer means reads said digital signal sample stream and for detecting a second prespecified frequency component within said read digital signal sample stream a subsequent time said read sequencer means reads said digital signal sample stream.

10. A receiver as in claim 9 wherein:
said write sequencer means writes said digital signal sample stream in a first chronological order; and
said read sequencer means reads said stored digital signal sample stream in a second chronological order opposite said first chronological order beginning with the last sample in said stream written by said read sequencer means.

11. A method of receiving and detecting specialized tones on a digital signal bus carrying a pulse code modulated digital signal sample stream corresponding to a speech channel, said method comprising the steps of:
temporarily storing said bus digital signal sample stream in an input buffer memory;
writing said sample stream into said input buffer memory in a first sequential chronological order;
reading said written sample stream from said input buffer memory in a second sequential chronological order opposite said first chronological order; and
detecting at least one prespecified frequency component within said read sample stream.

12. A method as in claim 11 further including the step of alternately granting access of said input buffer memory to said reading step and to said writing step in accordance with a predetermined priority wherein said reading step has a higher priority than said writing step.

13. A method as in claim 11 wherein said detecting means includes the step of filtering said read sample stream symmetrically with time.

14. A specialized tone receiving method for receiving and detecting specialized tones simultaneously in plural independent time division multiplexed PCM speech channels each carrying a corresponding digital sample sequence, said method comprising the steps of:
temporarily storing said digital sample sequences carried by said plural speech channels in an input buffer memory.
writing said digital sample sequences into said memory, including the step of writing each of said sample sequences in a first sequential chronological order;
selecting one of said speech channels;
reading the signal sample sequence corresponding to said selected speech channel from said input buffer memory in a second sequential chronological order opposite said first chronological order; and
detecting at least one prespecified frequency component within said read signal sample sequence.

15. A method as in claim 14 wherein:
said method further includes repeating said reading step at least once to provide first and second identical read signal sample sequences; and
said detecting step includes the following steps:
detecting a first frequency component in said first read signal sample sequence, and
detecting a second frequency component different from said first frequency component in said second read signal sample sequence.

16. A method as in claim 14 wherein said detecting step comprises the step of symmetrically filtering said read signal sample sequence.

17. A method as in claim 14 further including the step of alternately granting access of said input buffer memory to said reading step and to said writing step in accordance with a predetermined priority wherein said reading step has a higher priority than said writing step.

18. A method as in claim 14 wherein said selecting, reading and detecting steps are performed for each of said digital sample sequences, and said writing step is continually performed.

19. A method for detecting specialized tones in a pulse code modulated digital signal sample stream corresponding to a speech channel, said method including the following steps:

(a) continually writing portions of said digital signal sample stream into a memory;

(b) temporarily storing the written portions of said digital signal sample stream in said memory;

(c) reading a written digital signal sample stream portion from said memory;

(d) detecting a first prespecified frequency component within said read sample stream portion read by said reading step (c);

(e) again reading said written digital signal sample stream portion from said memory; and (f) detecting a second prespecified frequency component different from said first component within said read sample stream portion read by said again reading step (e).

20. A method as in claim 19 wherein said writing step (a) writes said sample stream portion in a first order, and said reading and again reading steps (c) and (e) each read said temporarily stored sample stream portion in a second order opposite said first order.

21. A method as in claim 19 further including the step of alternately granting access of said input buffer memory to: (i) said reading step (c) and again reading step (e), and (ii) to said writing step (a) in accordance with a predetermined priority wherein said reading steps (c), (e) have a higher priority than said writing step (a).

* * * * *